(12) United States Patent
Tani

(10) Patent No.: US 7,731,440 B2
(45) Date of Patent: Jun. 8, 2010

(54) APPLICATION MATERIAL EXTRUDING CONTAINER AND FORMING METHOD OF APPLICATION MATERIAL EXTRUDING CONTAINER

(75) Inventor: Yoshikazu Tani, Kawaguchi (JP)

(73) Assignee: Tokiwa Corporation, Gifu (JP)

( * ) Notice: Subject to any disclaimer, the term of this patent is extended or adjusted under 35 U.S.C. 154(b) by 0 days.

(21) Appl. No.: 12/076,568

(22) Filed: Mar. 20, 2008

(65) Prior Publication Data

US 2008/0237932 A1 Oct. 2, 2008

(30) Foreign Application Priority Data

Mar. 30, 2007 (JP) .............................. 2007-093508

(51) Int. Cl.
 *B43K 21/08* (2006.01)
(52) U.S. Cl. ......................................... 401/75; 222/390
(58) Field of Classification Search ................... 401/75, 401/76, 172, 173, 174; 222/390
 See application file for complete search history.

(56) References Cited

U.S. PATENT DOCUMENTS 2,846,705 A * 8/1958 Marz ........................... 401/10

7,051,642 B2 * 5/2006 Kageyama .................... 92/136
7,217,054 B2 * 5/2007 Noguchi ...................... 401/277

FOREIGN PATENT DOCUMENTS

JP 2006-136421 1/2006

* cited by examiner

*Primary Examiner*—David J Walczak
(74) *Attorney, Agent, or Firm*—Bacon & Thomas, PLLC

(57) ABSTRACT

To reduce manufacturing cost of an extruding container, a female thread member (5) integrally has an outer tube (5a) and an inner tube (5b) with an annular space (5s) between them being open to one side in an axial direction, and the inner tube (5b) has a female thread (5e) formed on an inner peripheral surface from one side and to extend in the axial direction and slits (5n) extending in the axial direction and being open to one side, while a core pin including a male thread corresponding to the female thread (5e) and a protruding portion corresponding to the slits (5n), is drawn out from an outer mold after a middle mold having a convex portion corresponding to the space (5s), whereby the core pin can be drawn out without breaking the female thread (5e) as the inner tube (5b) is expanded by the slit (5n).

7 Claims, 24 Drawing Sheets

APPLICATION MATERIAL EXTRUDING CONTAINER AND FORMING METHOD OF APPLICATION MATERIAL EXTRUDING CONTAINER

BACKGROUND OF THE INVENTION

1. Field of the Invention

The present invention relates to an application material extruding container for extruding an application material so as to use it, and a forming method of the same.

2. Description of the Conventional Art

Conventionally, as an applying filler extruding container for extruding an applying filler so as to use it, a technique in Japanese Unexamined Patent Publication No. 2006-136421 has been known. The technique described in Japanese Unexamined Patent Publication No. 2006-136421 is provided with a filling member formed in a tubular shape, having a discharge port in a leading end and filled with an applying filler, a main body tube engaging with the filling member in a rotating direction around an axis and engaging in an axial direction so as to be integrated, a movable body having a male thread on an outer peripheral surface and extruding the applying filler by moving forward so as to discharge the applying filler from a discharge port, a female thread member (a thread tube) having a female thread engaging with a male thread of the movable body on an inner peripheral surface and engaging with the main body tube in the rotating direction and the axial direction so as to be integrated, and an operation tube provided with a shaft body having an outer shape engaging so as to be movable in the axial direction as well as engaging with an inner shape of the movable body in the axial direction so as to construct the movable body and a rotation preventing portion, and engaging with the main body tube in the axial direction so as to be relatively rotatable, wherein in the case that the operation tube constructing a rear portion of the container and the filling member constructing a front portion of the container are relatively rotated, the movable body moves forward on the basis of an operation of an engagement portion constituted by the female thread of the female thread member and the male thread of the movable body, and the application material within the container appears from an opening at the leading end of the container. Further, the female thread member has the female thread engaging with the male thread of the movable body on the inner peripheral surface and has a function of moving the movable body, as mentioned above.

The female thread member is integrally provided with an outer tube and an inner tube which are formed in a cylindrical shape and are coaxially arranged, and a coupling portion coupling them, the inner tube is formed short in the axial direction with respect to the outer tube as well as being arranged within the outer tube, the coupling portion is formed in an annular shape and couples a leading end portion of the outer tube and a leading end portion of the inner tube, the female thread extending from a leading end side of an inner peripheral surface of the inner tube to a midway in the axial direction is formed within the inner tube, and an annular space open to a rear side is provided at the rear side of the coupling portion between the outer tube and the inner tube.

Further, the female thread member mentioned above is generally manufactured in accordance with an injection molding by resin. In this injection molding, there is generally employed a method of preparing a core pin (a metal mold; an inner mold) constructed in a columnar shape and having a male thread corresponding to the female thread of the inner tube inner peripheral surface on an outer peripheral surface, an inner mold (a metal mold) constructed in a columnar shape, provided with an annular convex portion corresponding to the space between the outer tube inner peripheral surface and the inner tube outer peripheral surface at a peripheral edge of the leading end surface and provided with a convex portion corresponding to the portion at the rear side of the female thread of the inner tube inner peripheral surface at the center of the leading end surface, and an outer mold (a metal mold) having a shape corresponding to the outer tube outer peripheral surface on the inner peripheral surface, flowing molten resin into a gap between the molds, and releasing the resin from the molds after solidification so as to obtain the female thread member.

SUMMARY OF THE INVENTION

Problem to be Solved by the Invention

However, in the injection molding mentioned above, if the core pin is drawn out in the axial direction at a time of mold releasing, so-called forced extraction is generated and the female thread of the female thread member is broken. Accordingly, it is necessary to draw out the core pin while turning the core pin, however, it takes a long time and a manufacturing cost becomes high.

The present invention is made for the purpose of solving the problem mentioned above, and an object of the present invention is to provide an application material extruding container provided with a female thread member having a novel structure which can reduce a manufacturing cost and can improve a productivity while having the same function as that of the conventional female thread member, and a forming method of the same.

Means for Solving the Problem

In accordance with the present invention, there is provided an application material extruding container comprising:

a female thread member and a movable body provided within the container; and an engagement portion constituted by a female thread provided on an inner peripheral surface of the female thread member and a male thread provided on an outer peripheral surface of the movable body;

the engagement portion being actuated on the basis of a relative rotation of a container front portion and a container rear portion, whereby the movable body moves forward and an application material within the container appears from an opening at a leading end of the container, wherein the female thread member is constructed by integrally forming an outer tube, and an inner tube arranged in an inner side of the outer tube so as to be approximately coaxial with the outer tube and structured such that a part or the whole of the inner tube is positioned within the outer tube, a space portion open to one side in the axial direction is annularly provided between the outer tube and the inner tube, and the inner tube is provided with the female thread formed on an inner peripheral surface thereof and formed from one side in the axial direction so as to extend in the axial direction, and slits communicating inner and outer sides in a diametrical direction, extending in the axial direction and being open to one side.

In accordance with the application material extruding container mentioned above, since the inner tube is expanded to the outer side in the diametrical direction owing to the slit of the inner tube, by the operation of inserting a core pin (an inner mold) having a male thread corresponding to the female thread of the inner tube inner peripheral surface and a protrusion portion corresponding to the slit on the outer peripheral surface, and a middle mold provided with an annular convex portion corresponding to the annular space portion between the outer tube inner peripheral surface and the inner tube outer peripheral surface at a leading end portion, from one side of an outer mold having a shape corresponding to the outer tube outer peripheral surface on the inner peripheral surface, flowing molten resin into the gap between the molds, and drawing out the middle mold to one side and then drawing out the core pin to one side at a time of releasing the resin from the molds after being solidified, and the inner tube is not prevented from being expanded to the outer side in a diametrical direction by drawing out the middle mold prior to the core pin, the core pin can be drawn out without breaking the female thread. Accordingly, there can be provided the application material extruding container provided with the female thread member having the novel structure which can reduce the manufacturing cost and can improve the productivity while having the same function as that of the conventional female thread member.

In this case, when the coupling portion continuously provided at the other side end portion which is at an opposite side in the axial direction to the one side of the slits, and the outer tube and the inner tube so as to integrate them, is positioned at the other side than the other side end portion of the female thread, it is possible to promote the expansion to the outer side in the diametrical direction of the inner tube by the slit at a time of drawing out the core pin to the one side, and it is possible to further easily draw out the core pin without breaking the female thread.

Further, as the application material extruding container provided with the female thread member mentioned above, there can be specifically shown a structure which is provided with a filling member constructing the container front portion and being filled with the application material, and an operation tube constructing the container rear portion and engaging so as to be movable in the axial direction as well as synchronously rotating around the axis with respect to the movable body, and in which an outer peripheral surface of an outer tube of the female thread member has an engagement portion synchronously rotating around the axis with the filling member.

Further, as the application material extruding container provided with the female thread member mentioned above, there can be specifically shown a structure which is provided with a filling member constructing the container front portion and being filled with the application material, and a rotation stop member engaging so as to be movable in the axial direction as well as synchronously rotating around the axis with respect to the movable body, and engaging with a container rear portion in the rotating direction around the axis and the axial direction so as to be integrated, and in which an outer peripheral surface of an outer tube of the female thread member has an engagement portion synchronously rotating around the axis with the filling member, and an engagement portion engaging with the rotation stop member in the axial direction so as to be relatively rotatable.

Further, as a structure of the rotation stop member, there can be specifically shown a structure having an engagement portion engaging with the filling member in the axial direction so as to be relatively rotatable.

Further, as the container rear portion and the rotation stop member, there can be specifically shown a structure in which the container rear portion has engagement pawl pieces provided in a protruding manner at a bottom so as to extend in the axial direction, and the rotation stop member is engaged at a bottom thereof with the container rear portion in the axial direction by the engagement pawl pieces and is engaged in the rotating direction around the axis.

Further, when a cylinder portion constructing the rotation stop member is provided with slits and has flexibility, a shock is relaxed on the basis of the flexibility, for example, in the case that an external shock is applied by dropping of the container from a leading end side thereof in a state in which a cap is put on, whereby it is possible to prevent the filling member and the rotation stop member from coming off and prevent each of the portions from being broken.

Further, as a method of forming the application material extruding container, there is specifically employed a method comprising the steps of drawing out the metal mold of the annular space portion between the outer tube and the inner tube to one side, and thereafter drawing out the metal mold of the female thread to one side by utilizing elasticity generated by the slits which is open to one side. Accordingly, it is possible to draw out the core pin without breaking the female thread.

Effect of the Invention

As mentioned above, in accordance with the application material extruding container and the forming method of the application material extruding container on the basis of the present invention, it is possible to provide the application material extruding container provided with the female thread member having the novel structure which can reduce the manufacturing cost and can improve the productivity while having the same function as that of the conventional female thread member.

DETAILED DESCRIPTION OF PREFERRED EMBODIMENT

Figure 1:
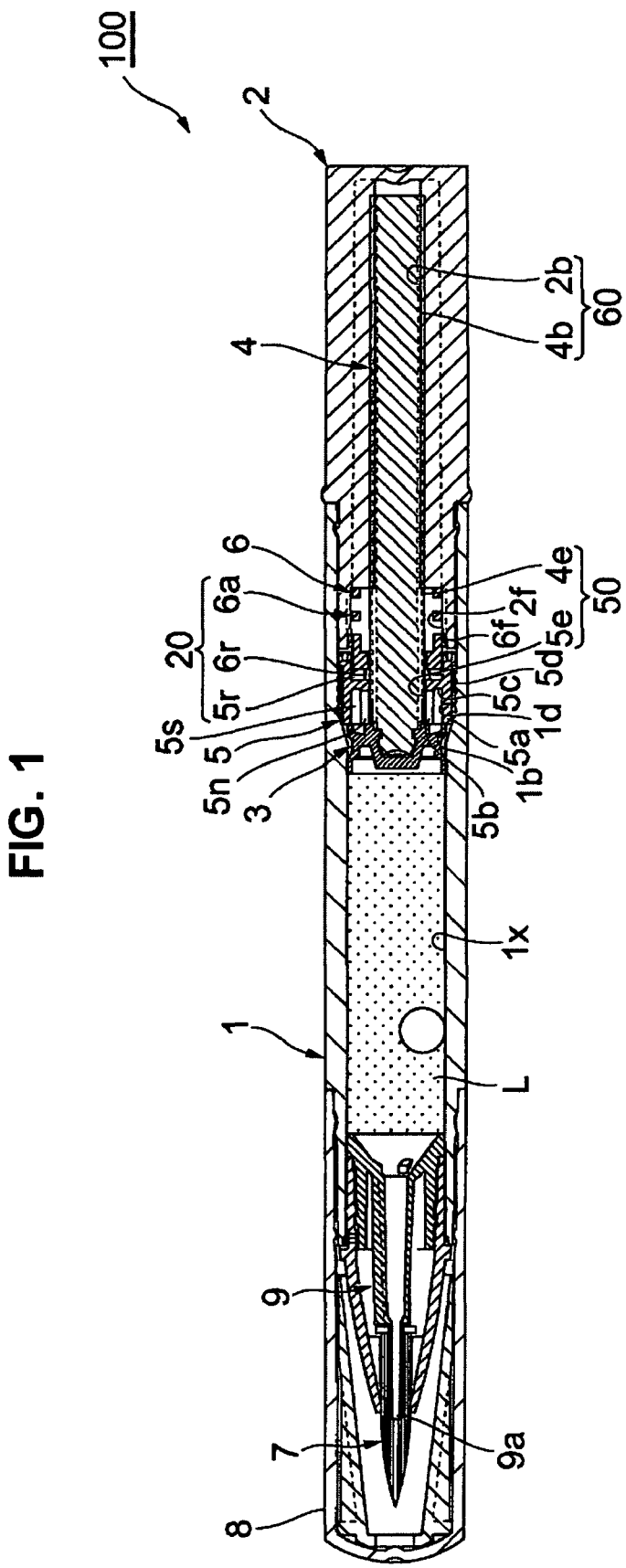
FIG. 1 is a longitudinal sectional view showing an initial state of an application material extruding container in accordance with a first embodiment of the present invention.

A description will be given below of preferable embodiments of an application material extruding container and a forming method of the same in accordance with the present invention with reference to FIGS. 1 to 24. In this case, in each of the drawings, the same reference numerals are attached to the same elements and an overlapping description will be omitted.

Figure 2:
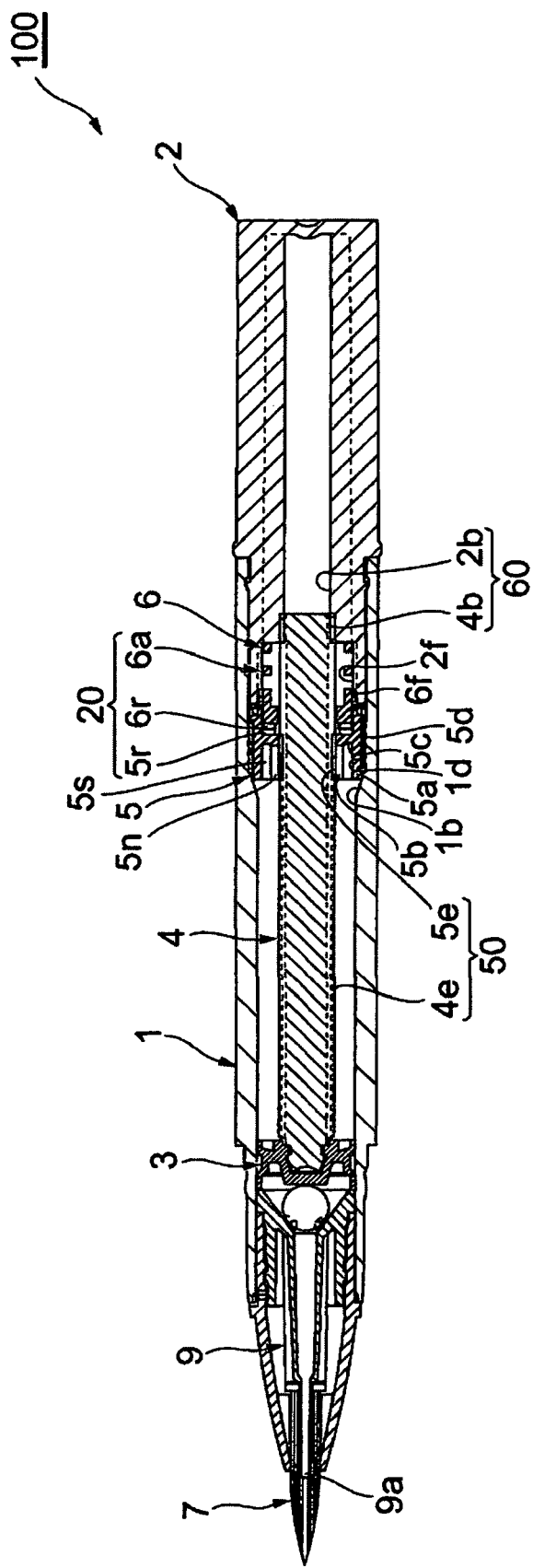
FIG. 2 is a longitudinal sectional view at a time when a movable body of the application material extruding container shown in FIG. 1 moves forward to the maximum.
Figure 3:
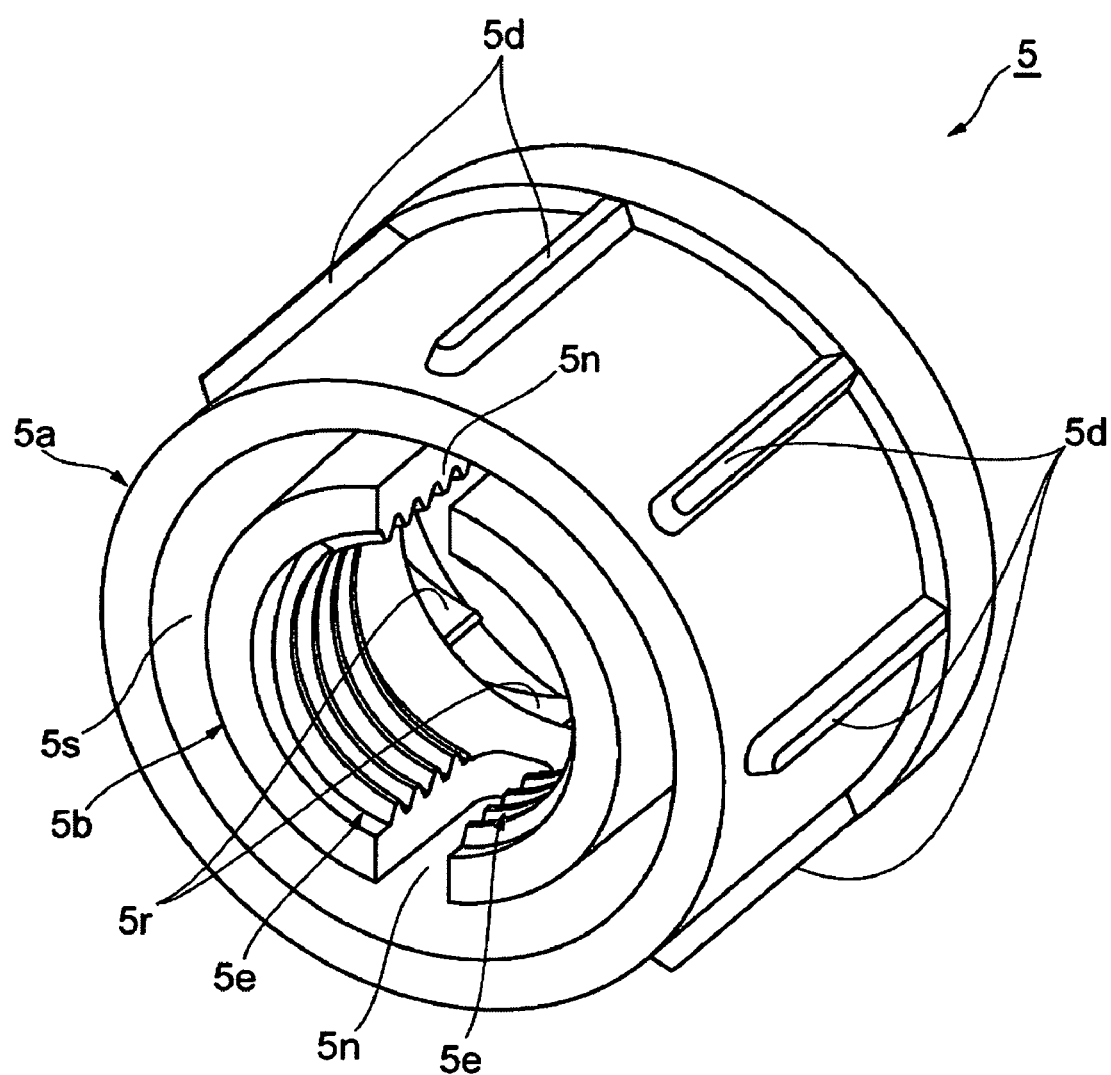
FIG. 3 is a perspective view showing a female thread member in FIGS. 1 and 2.
Figure 4:
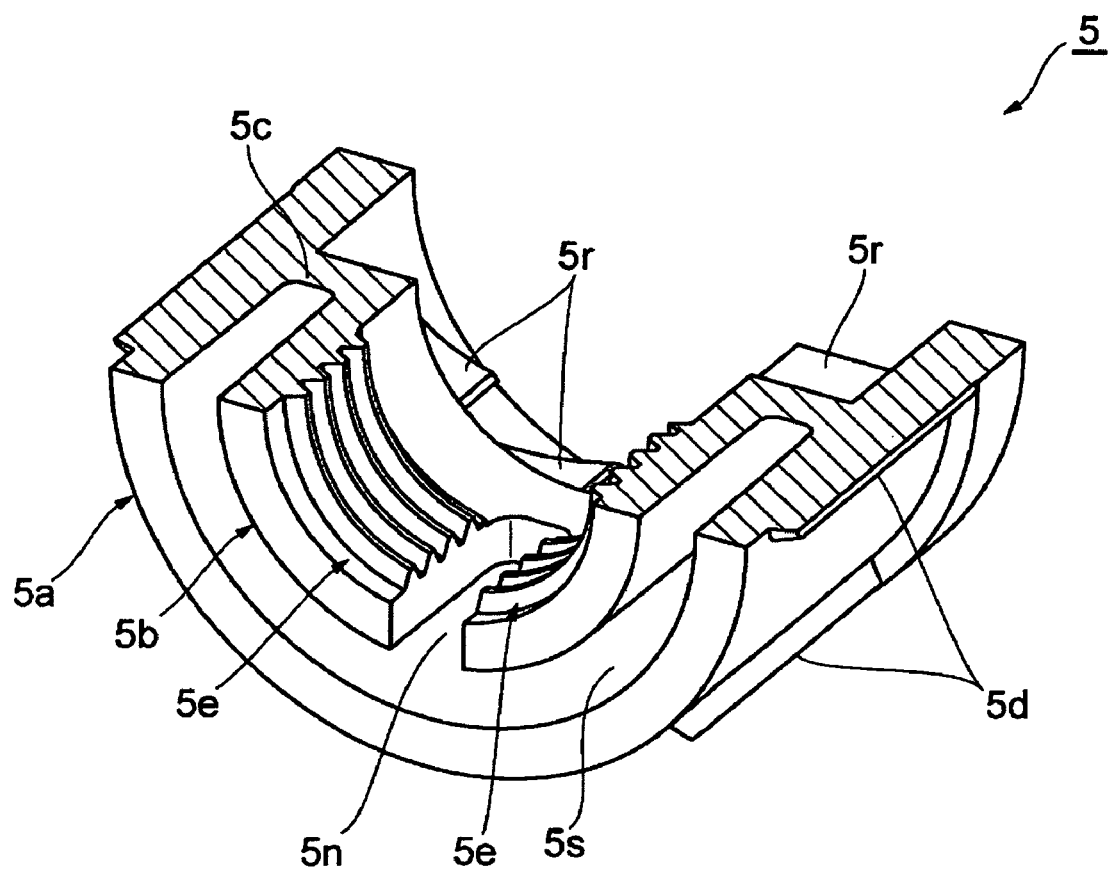
FIG. 4 is a longitudinal sectional perspective view of the female thread member shown in FIG. 3.
Figure 5:
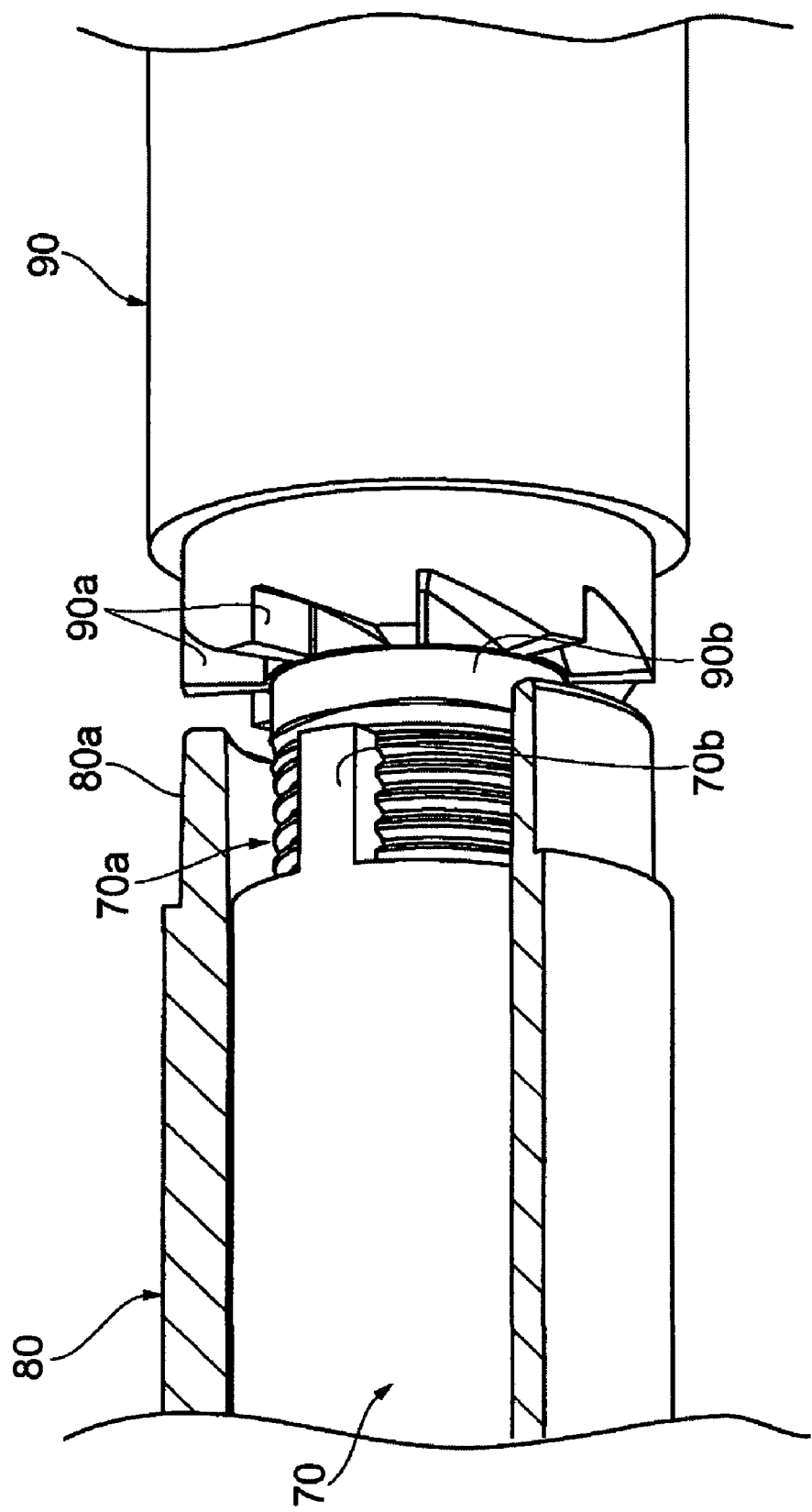
FIG. 5 is a view of a state in which a forming metal mold of the female thread member shown in FIG. 3 is set to a forming position.
Figure 6:
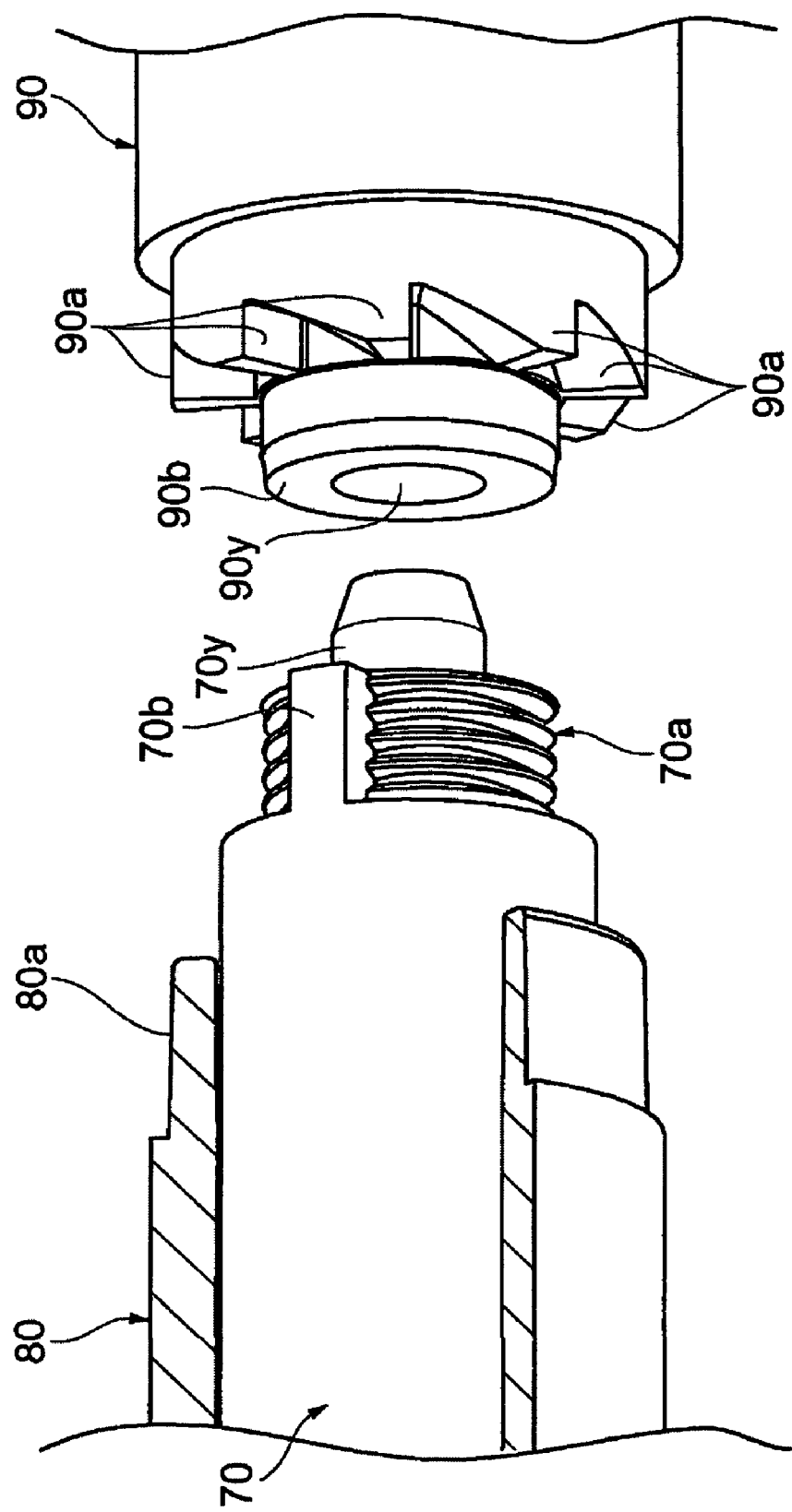
FIG. 6 is a perspective view showing a state in which the forming metal mold is released from the state in FIG. 5.

FIGS. 1 to 6 show a first embodiment in accordance with the present invention, FIGS. 7 to 20 show a second embodiment in accordance with the present invention, and FIGS. 21 to 24 show a third embodiment in accordance with the present invention, respectively. FIGS. 1 and 2 are longitudinal sectional views showing each of states of an application material extruding container in accordance with the first embodiment of the present invention, FIGS. 3 and 4 are views showing a female thread member, and FIGS. 5 and 6 are views for explaining a forming method of the female thread member. The application material extruding container in accordance with the present embodiment can accommodate an application material and appropriately extrude the application material on the basis of an operation of a user.

In this case, the application material can be, for example, a kneaded state semisolid material and a soft solid material including a liquid state, a jelly state, a gel state and a paste state, in addition to a lip gloss, a lip stick, an eye color, an eye liner, a beauty liquid, a cleaning fluid, a nail enamel, a nail care solution, a nail enamel remover, a mascara, an anti-aging, a hair color, a hair cosmetic material, an oral care material, a massaging oil, a keratotic plug removing liquid, a foundation, a concealer, a skin cream, an ink for a writing instrument such as a marking pen or the like, a liquid medicine, a slurry material and the like.

As shown in FIG. 1, an application material extruding container 100 is provided with a cylindrical main body tube (a filling member) 1 constructing a container front portion and having a filling region 1x to be filled with an application material L in an inner portion, a closed-end cylindrical operation tube 2 constructing a container rear portion, engaging the main body tube 1 in an axial direction as well as engaging in a rotating direction around an axis, and being installed so as to be relatively rotatable and be immovable in the axial direction, and a brush (an application body) 7 installed to a leading end side of the main body tube 1, as an outer shape structure.

Within the container, there are arranged a stick-shaped movable body 4 provided with a piston 3 at a leading end portion and provided for extruding the application material L, a female thread member 5 allowing only a forward movement as well as moving the movable body 4 and being provided for giving a click feeding, and a click member 6 cooperating with the female thread member 5.

The movable body 4 is provided with a male thread 4e over an approximately whole length of an outer peripheral surface, and is provided with a pair of concave grooves 4b extending in an axial direction at opposing positions on the outer peripheral surface. Among a plurality of protrusions 2b provided on an inner peripheral surface of the operation tube 2 in such a manner as to protrude radially to an inner side, a pair of opposing protrusions 2b enter into the concave grooves 4b so as to be engaged in the rotating direction around the axis. Accordingly, the movable body 4 is structured such as to be synchronously rotatable and be movable in the axial direction with respect to the operation tube 2.

The click spring member 6 is arranged between a female thread member 5 arranged at a front side of the click spring member 6 and leading end surfaces of the protrusions 2b of the main body tube 2, and is provided with ratchet teeth 6r (described in detail later) protruding forward along a peripheral direction on the leading end surface.

The click spring member 6 is structured such that a rear half portion is formed as an elastic body 6a for energizing the ratchet teeth 6r to a front side in the axial direction, and integrally formed with a front portion therefrom. The elastic body 6a is constituted by a compression spring having a spiral slit in this case.

Further, in the click spring member 6, a plurality of protrusions 6f extending at a predetermined length in the axial direction are provided along a peripheral direction on an outer peripheral surface between the ratchet teeth 6r and the compression spring 6a, and are engaged with a knurling 2f extending at the predetermined length along the axial direction on an inner peripheral surface of a leading end portion of the operation tube 2 and having concavities and convexities densely provided in parallel along the peripheral direction, in the rotating direction around the axis. Accordingly, the click spring member 6 is synchronously rotatable with respect to the operation tube 2. In this state, the ratchet teeth 6r of the click spring member 6 is set to a state of being energized forward by the compression spring 6a.

The female thread member 5 characterizes the present embodiment. For example, the female thread member 5 is integrally formed in accordance with an injection molding by using a flexible material such as synthetic resin or the like. As shown in FIGS. 3 and 4, the female thread member 5 is integrally provided with an outer tube 5a structured in an approximately cylindrical shape, an inner tube 5b arranged at an inner side of a front half portion of the outer tube 5a so as to be approximately coaxial with the outer tube 5a and structured in an approximately cylindrical shape, an annular coupling portion 5c continuously provided at an approximate middle in the axial direction of the outer tube 5a and a rear end of the inner tube 5b so as to couple them, and a plurality of ratchet teeth 5r (described in detail later) provided along a peripheral direction on rear end surfaces of the inner tube 5b and the coupling portion 5c so as to protrude to a rear side. Accordingly, a space portion 5s which is open to one side (a left side in the figure) in the axial direction is annularly provided between the outer tube 5a and the inner tube 5b.

The inner tube 5b of the female thread member 5 is provided with a pair of slits 5n at both sides with respect to the axis. The slits 5n communicate inner and outer sides in a diametrical direction and extend in the axial direction while leading ends being open to one side (a front side) in the axial direction so as to reach a portion near a rear end of the inner tube 5b. Further, an inner peripheral surface of the inner tube 5b is provided with a female thread 5e in such a manner as to be separated into semicircular arc sections by the slits 5n and 5n. The female thread 5e is formed from one side (a front side) in the axial direction and extends in the axial direction so as to reach a portion near a rear end of the slit 5n.

In the female thread member 5, a plurality of protrusions (engagement portions) 5d are provided on an outer peripheral surface of the outer tube 5a along the peripheral direction and extend at a predetermined length in the axial direction. Since the protrusions 5d are engaged with the knurling 1d extending at the predetermined length along the axial direction on the inner peripheral surface of the main body tube 1 and being densely provided with the concavities and convexities in parallel along the peripheral direction, in the rotating direction around the axis, as shown in FIG. 1, the female thread member 5 is synchronously rotatable with respect to the main body tube 1. In this state, the female thread member 5 is energized forward by the compression spring 6a of the click spring member 6, and is brought into contact with an inclined surface 1b of the inner peripheral surface of the main body tube 1 so as to be set to a state in which a forward movement is inhibited, and the ratchet teeth 5r can be engaged (can be meshed) with the ratchet teeth 6r of the click spring member 6 in the rotating direction around the axis. Further, there is obtained a state in which the male thread 4e provided on the outer peripheral surface of the movable body 4 is engaged with the female thread 5e of the female thread member 5.

The ratchet teeth 5r and 6r are structured in a triangular shape in a side view obtained by combining an obtuse angle (or a right angle) and an acute angle, and are structured such as to allow only a relative rotation in one direction (a feed-out direction of the movable body 4) between the main body tube 1 with which the female thread member 5 is engaged in the rotating direction, and the operation tube 2 with which the click spring member 6 is engaged in the rotating direction, and inhibit a relative rotation in the other direction (a feed-back direction of the movable body 4) corresponding to an opposite direction to the one direction.

Further, an engagement portion (an engagement mechanism) 50 is structured by the female thread 5e of the female thread member 5 and the male thread 4e of the movable body 4, a rotation stop portion (a rotation stop mechanism) 60 is structured by the protrusions 2b of the operation tube 2 and the concave grooves 4b of the movable body 4, and a ratchet mechanism 20 is structured by the ratchet teeth 5r of the female thread member 5, the ratchet teeth 6r of the click spring member 6 and the compression spring 6a of the click spring member 6.

In the application material extruding container 100 structured as mentioned above, when a cap 8 shown in FIG. 1 is detached from the main body tube 1 by a user, and the main body tube 1 and the operation tube 2 are relatively rotated in one direction, the ratchet teeth 5r and 6r are relatively rotated in one direction in a synchronous manner, the movable body 4 is gradually fed out to the leading end side in accordance with the relative rotation as shown in FIG. 2 while a click feeling (a resistance feeling) is given to the user each time when the ratchet teeth 5r and 6r are engaged with each other.

The application material L in the filling region 1x is gradually extruded to the leading end side by a piston 3 at the leading end of the fed-out movable body 4, passes through a pipe member 9 installed to the leading end portion of the main body tube 1, and appears from an opening 9a at a leading end of the pipe member 9 so as to be discharged to a brush 7 and be set to a used state.

Next, a description will be given of a forming method of the female thread member 5 having the structure mentioned above, with reference to FIGS. 5 and 6. First, as shown in FIGS. 5 and 6, there are prepared metal molds comprising: a first core pin 70, that is, an inner mold which is structured in a columnar shape and has male threads 70a extending in an axial direction in correspondence to the female thread 5e on the inner peripheral surface of the inner tube 5b and a convex portion 70b extending in the axial direction in correspondence to the slit 5n and arranged at an outer side of the male threads 70a on an outer peripheral surface of a leading end portion; a middle mold 80 which is provided with an annular convex portion 80a corresponding to an annular space portion 5s between the inner peripheral surface of the outer tube 5a and the outer peripheral surface of the inner tube 5b at a leading end portion thereof; a second core pin 90 which has a shape corresponding to the inner peripheral surface of the outer tube 5a at the other side (a right side in the figure) than the coupling portion 5c on an outer peripheral surface, has ratchet teeth 90a corresponding to the ratchet teeth 5r at a leading end side thereof, and has a disc-shaped convex portion 90b corresponding to the inner peripheral surface at the other side than the female thread 5e of the inner tube 5b in the center closer to the leading end side than the ratchet teeth 90a; and an outer mold (not shown) which has a shape corresponding to the outer peripheral surface of the outer tube 5a on an inner peripheral surface thereof.

In this case, in order to avoid a complication in the figures, the outer mold and a molded product after the resin is solidified are omitted in FIGS. 5 and 6.

Further, as shown in FIG. 5, the core pins 70 and 90 are confronted with each other by inserting the first core pin 70 and the medium mold 80 from one side of the outer mold, and inserting the second core pin 90 from the other side at the opposite side in the axial direction to the one side of the outer mold. At this time, as shown in FIG. 6, a protrusion portion 70y having a columnar shape provided in a protruding manner in the center of a leading end surface of the first core pin 70 is fitted to a concave portion 90y having a circular cross sectional shape and being provided in a concave manner in the center of a leading end surface of the second core pin 90, and the core pins 70 and 90 are accurately positioned with each other.

In this state, as shown in FIG. 5, a leading end surfaces of the male threads 70a of the first core pin 70 is brought into contact with a leading end surface of the convex portion 90b of the second core pin 90, a space for forming the inner tube 5b is formed in a region surrounded by an outer peripheral surfaces of the male threads 70a of the first core pin 70, an outer peripheral surface of the convex portion 90b of the second core pin 90, an inner peripheral surface of the convex portion 80a of the middle mold 80, and an inner portion of the leading end surface of the ratchet tooth 90a, and a region except the convex portion 70b of the first core pin 70, a space for forming the coupling portion 5c and the ratchet teeth 5r is formed between the leading end surface of the convex portion 80a of the middle mold 80 and the ratchet teeth 90a of the second core pin 90, and a space for forming the outer tube 5a is formed between the outer peripheral surface of the convex portion 80a of the middle mold 80, the outer peripheral surface of the leading end portion of the second core pin 90 and the inner peripheral surface of the outer mold.

Next, molten resin is flowed into the space, that is, the gap between the molds, and a mold release is carried out after the molten resin is solidified. The mold release is carried out by sequent steps of first drawing out the middle mold 80 to one side, thereafter drawing out the first core pin 70 to one side and drawing out the second core pin 90 to the other side as shown in FIG. 6, and separating the outer mold.

Since the middle mold 80 has been already drawn out to the one side and the inner tube 5b is not prevented from expanding to the outer side in the diametrical direction, at a time of drawing out the first core pin 70 to one side, the inner tube 5b is expanded to the outer side in the diametrical direction by the slits 5n (refer to FIGS. 3 and 4) of the inner tube 5b, and it is possible to draw out the first core pin 70 without breaking the female thread 5e.

As mentioned above, in the present embodiment, the female thread member 5 is structured by integrally forming the outer tube 5a, and the inner tube 5b approximately coaxially formed with the outer tube 5a and positioned at the inner side, and is structured such as to be provided with the space portion 5s which is open to one side in the axial direction and formed in the annular shape, the female thread 5e which is provided on the inner peripheral surface of the inner tube 5b and is formed from one side in the axial direction so as to extend in the axial direction, and the slits 5n which communicate the inner and outer sides in the diametrical direction and extend in the axial direction so as to be open to one side, between the outer tube 5a and the inner tube 5b. Accordingly, there is employed the forming method mentioned above, that is, the method of drawing out the middle mold 80 corresponding to the annular space portion 5s between the outer tube 5a and the inner tube 5b to one side, and thereafter drawing out the first core pin 70 having the male threads 70a corresponding to the female thread 5e of the inner tube 5b to one side by utilizing the elasticity generated by the slits 5n which are open to one side of the inner tube 5b. It is possible to draw out the first core pin 70 without preventing the inner tube 5b from expanding to the outer side in the diametrical direction and without breaking the female thread 5e by drawing the middle mold 80 prior to the first core pin 70 as mentioned above. Therefore, it is possible to provide the application material extruding container 100 provided with the female thread member 5 having the novel structure which can reduce the manufacturing cost and can improve the productivity.

Further, in the female thread member 5, as shown in FIG. 4, since the end portions at the other side of the slits 5n, and the coupling portion 5c continuously provided with the outer tube 5a and the inner tube 5b so as to integrate them are positioned at the other side than the end portion at the other side of the female thread 5e, it is possible to promote the expansion to the outer side in the diametrical direction of the inner tube 5b by the slits 5n at a time of drawing out the first core pin 70 to one side, and it is possible to easily draw out the first core pin 70 without breaking the female thread 5e.

In this case, in the present embodiment, the whole of the inner tube 5b is positioned within the outer tube 5a, however, a part of the inner tube 5b may be positioned within the outer tube 5a.

Further, it is possible to structure a click mechanism allowing a relative rotation in the other direction of feeding back the movable body 4 in addition to a relative rotation in one direction for feeding out the movable body 4, by forming the shapes of the ratchet teeth 5x and 6r, for example, as chevron shaped click teeth having an ascending slope and a descending slope. In this case, the click teeth repeat engagement and disengagement in the rotating direction at a time of relatively rotating in the other direction, and the click feeling is generated.

Figure 7:
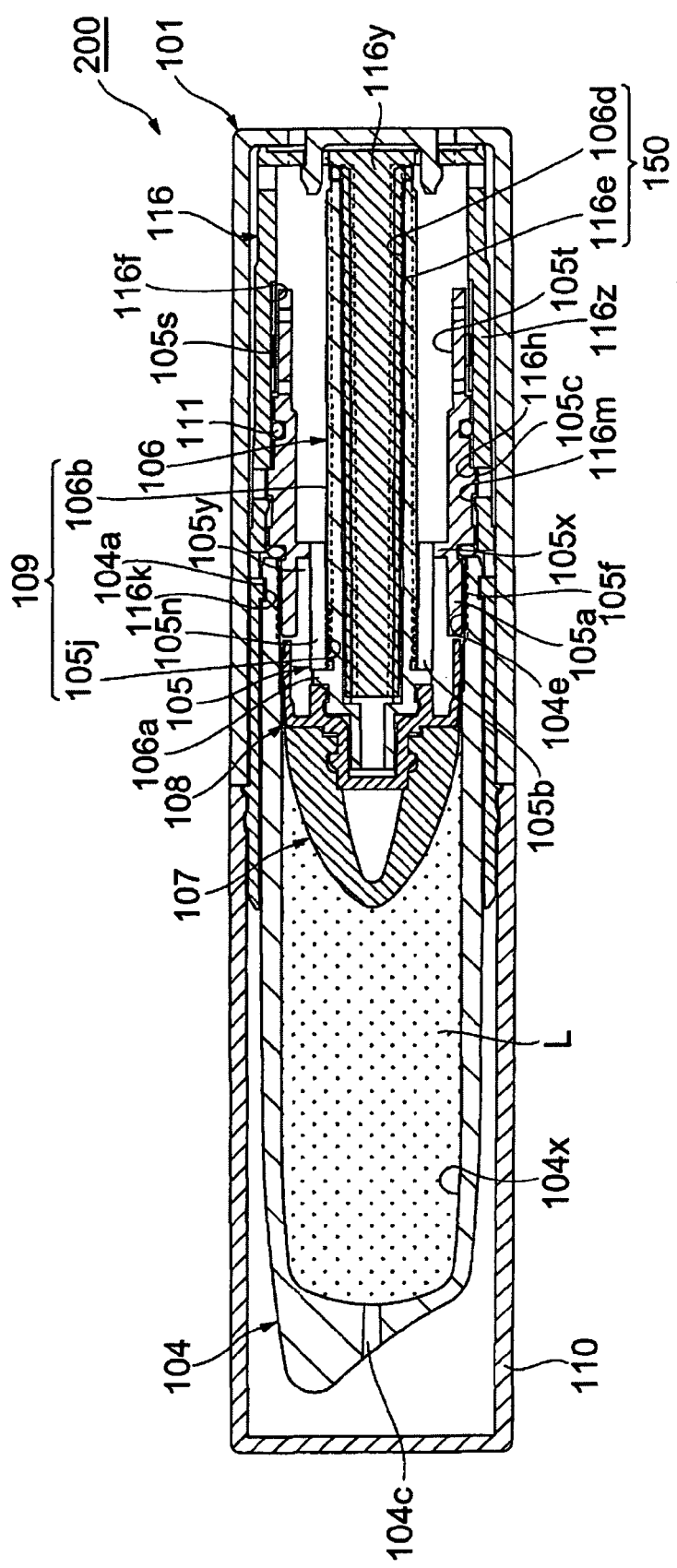
FIG. 7 is a longitudinal sectional view showing an initial state of an application material extruding container in accordance with a second embodiment of the present invention.
Figure 8:
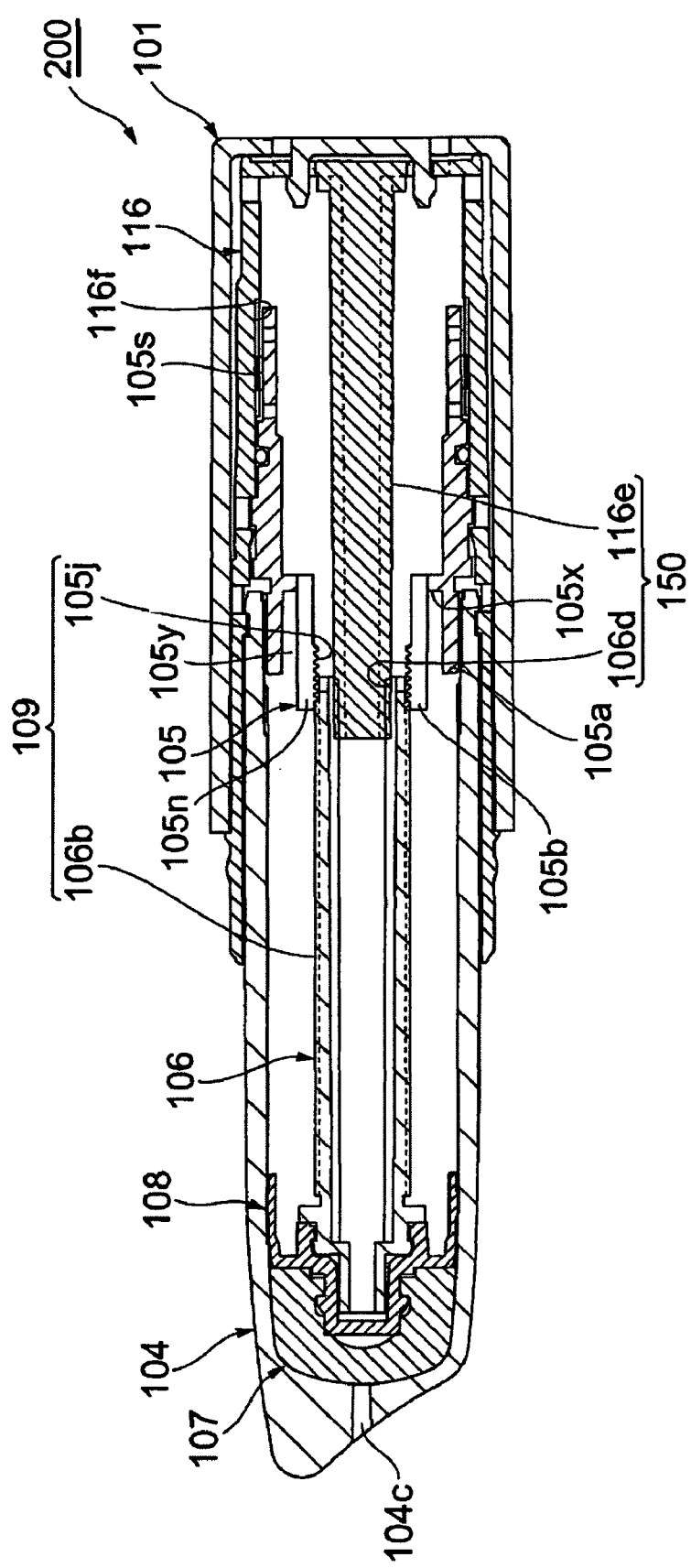
FIG. 8 is a longitudinal sectional view at a time when a movable body of the application material extruding container shown in FIG. 7 moves forward to the maximum.
Figure 9:
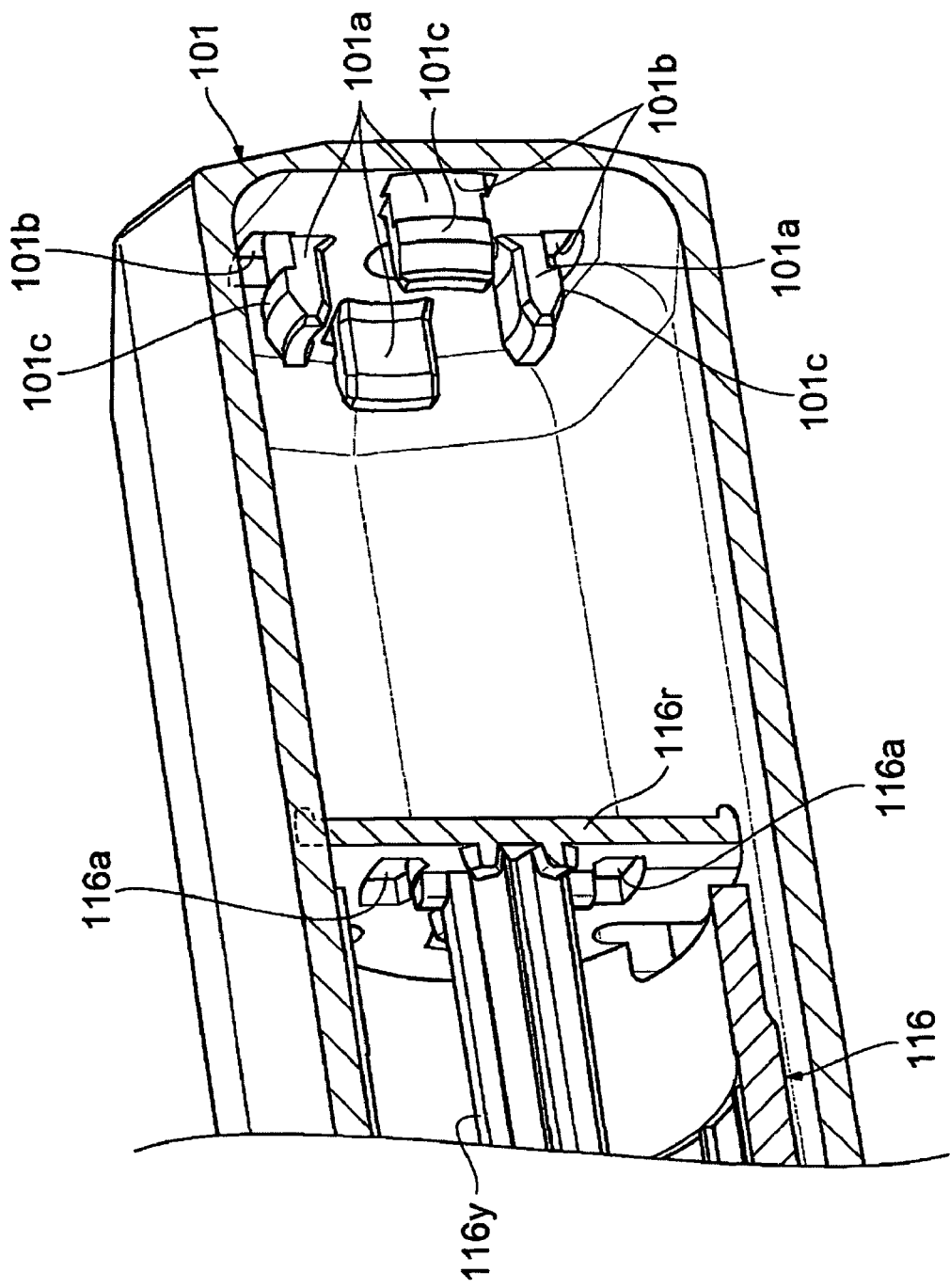
FIG. 9 is a breakaway exploded perspective view of a main body tube and a rotation stop member of the application material extruding container shown in FIGS. 7 and 8.
Figure 10:
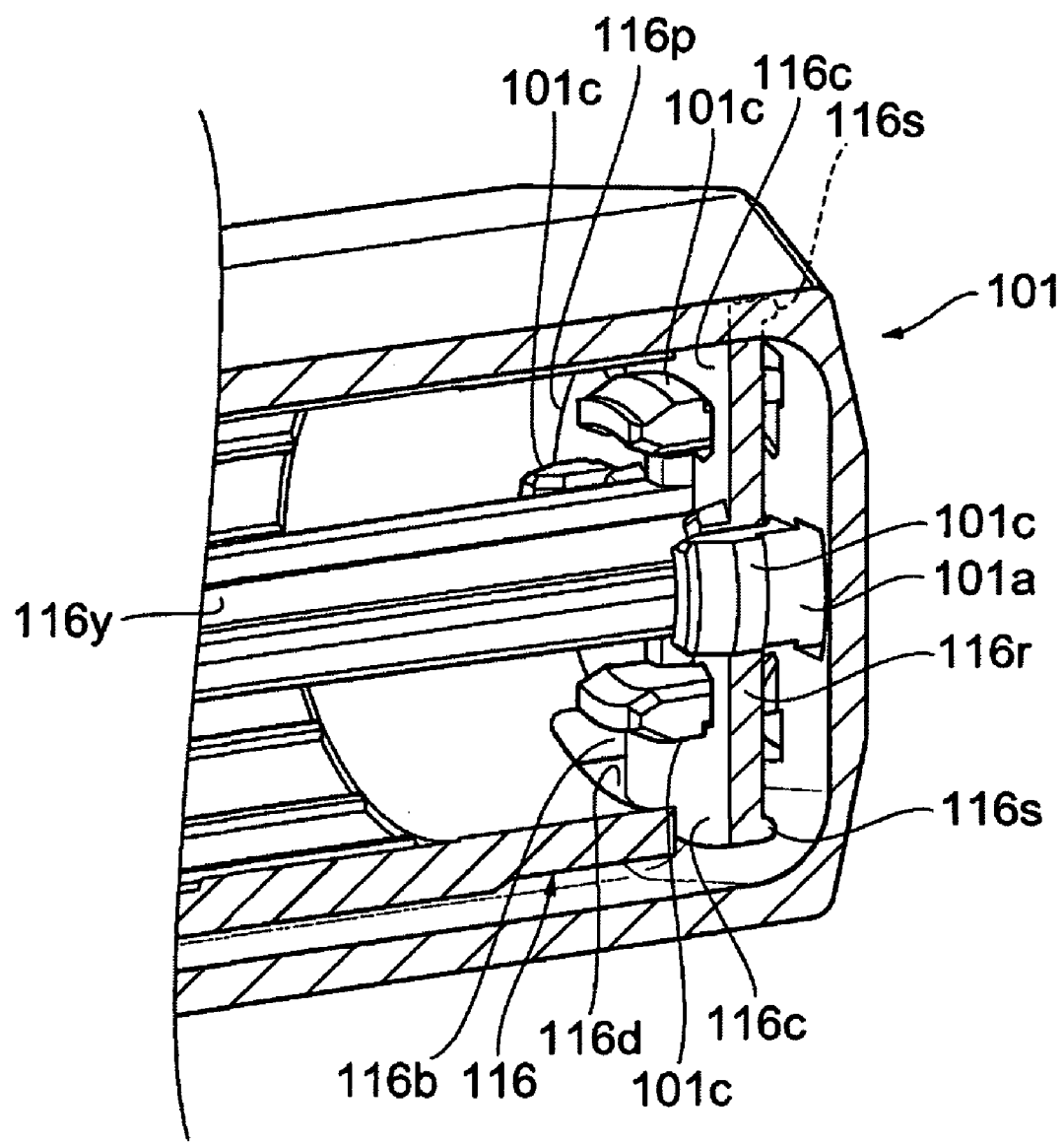
FIG. 10 is a breakaway perspective view of the main body tube and the rotation stop member of the application material extruding container shown in FIGS. 7 and 8.
Figure 11:
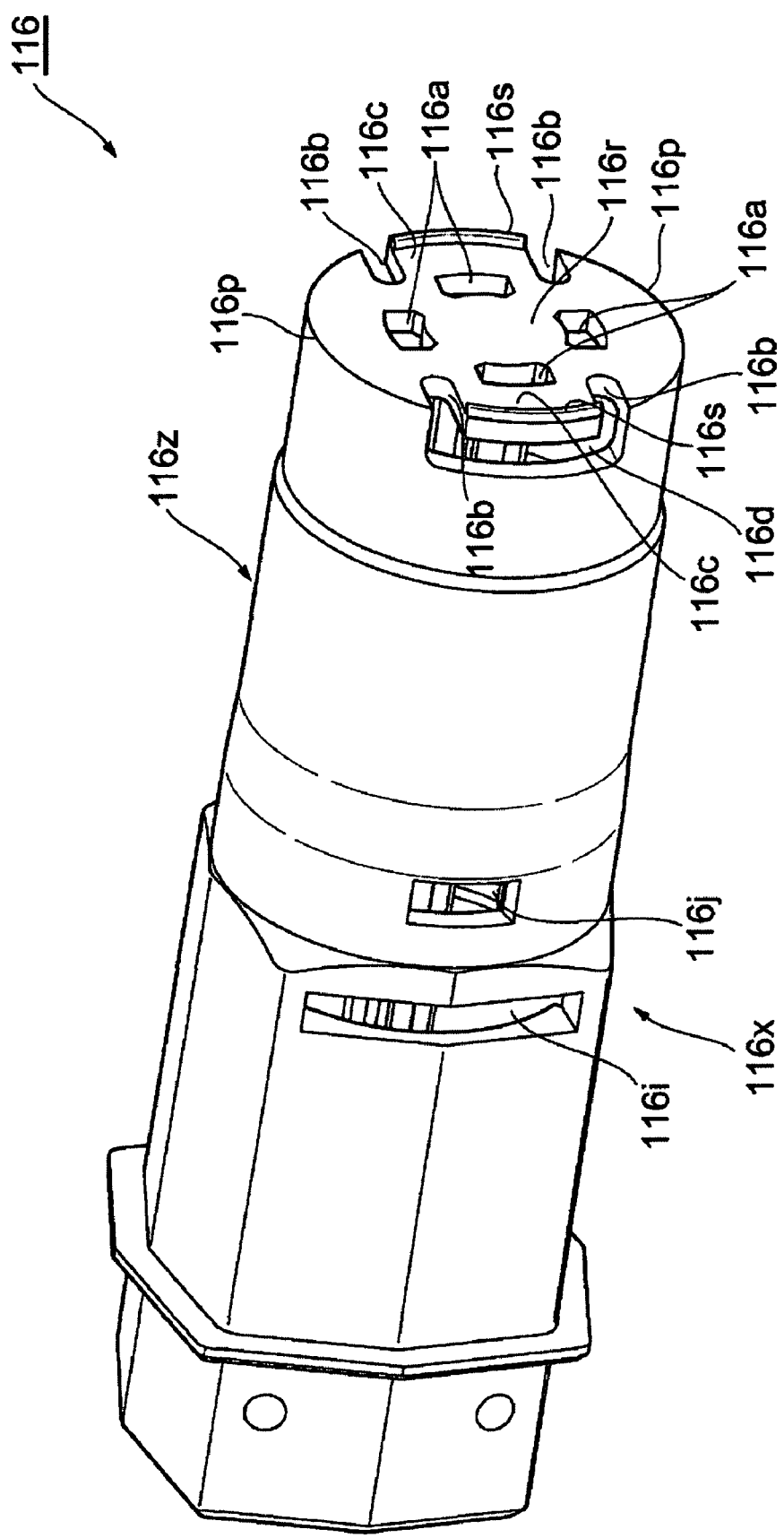
FIG. 11 is a perspective view showing the rotation stop member in FIGS. 7 and 8.
Figure 12:
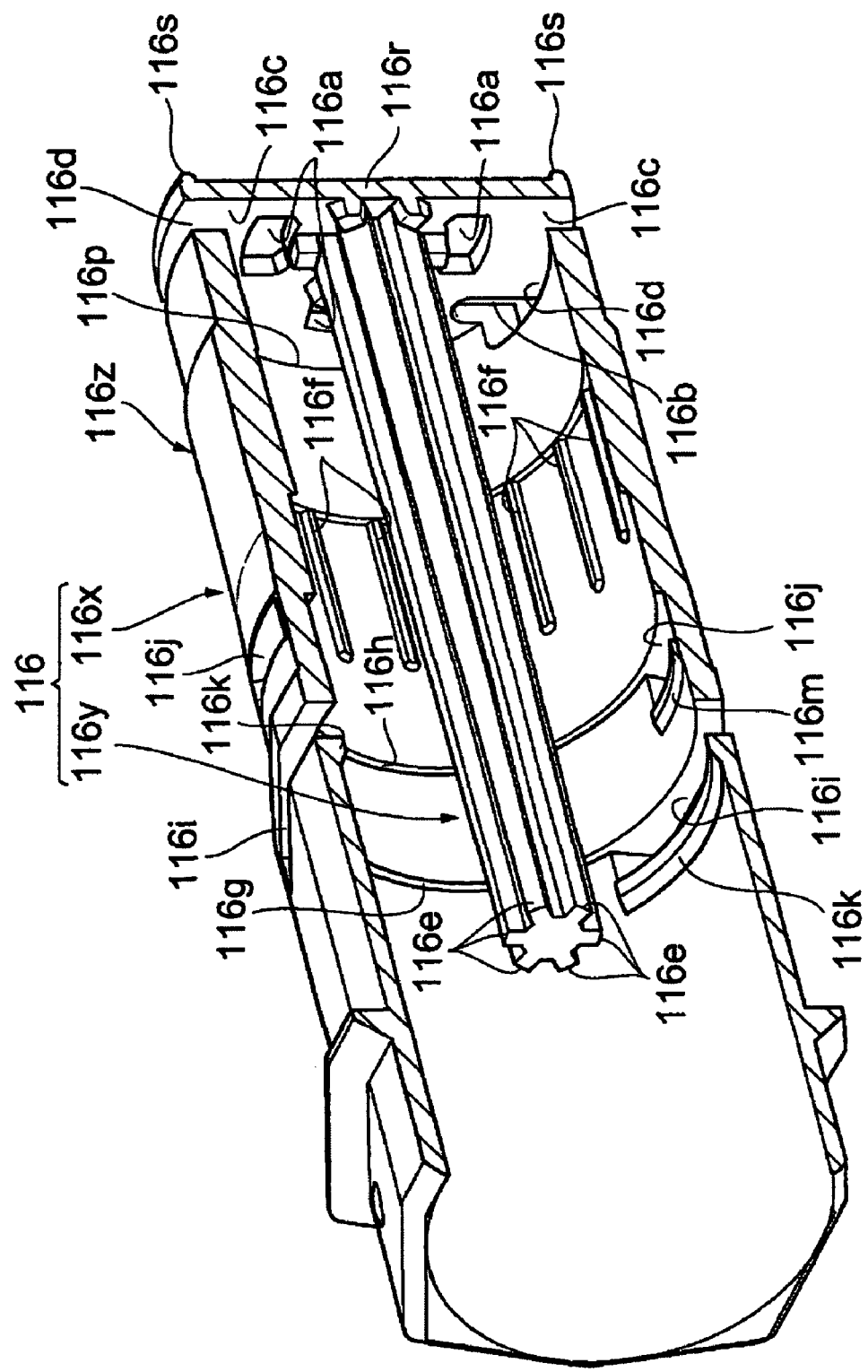
FIG. 12 is a breakaway perspective view of the rotation stop member shown in FIG. 11.
Figure 13:
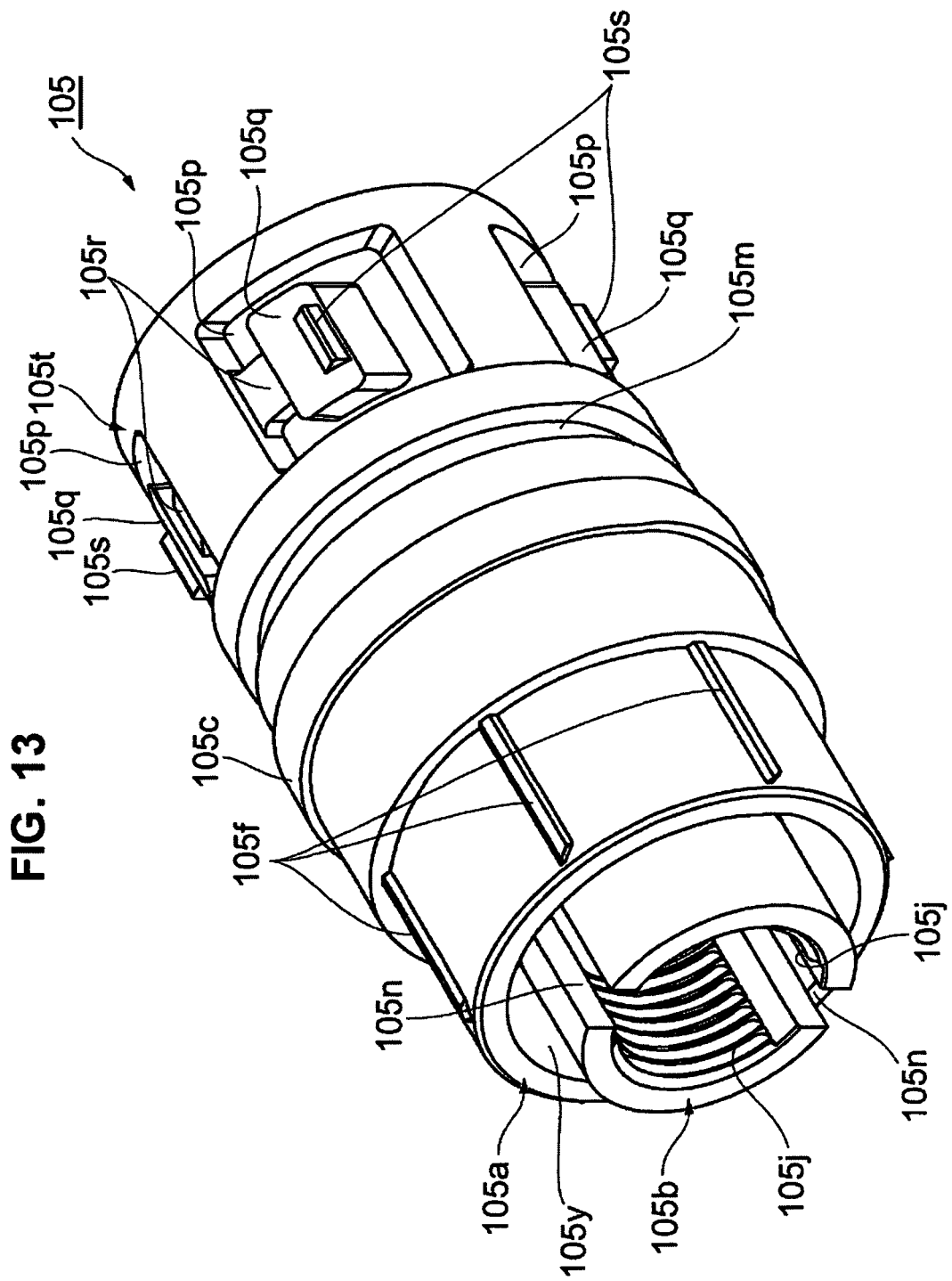
FIG. 13 is a perspective view showing a female thread member in FIGS. 7 and 8.
Figure 17:
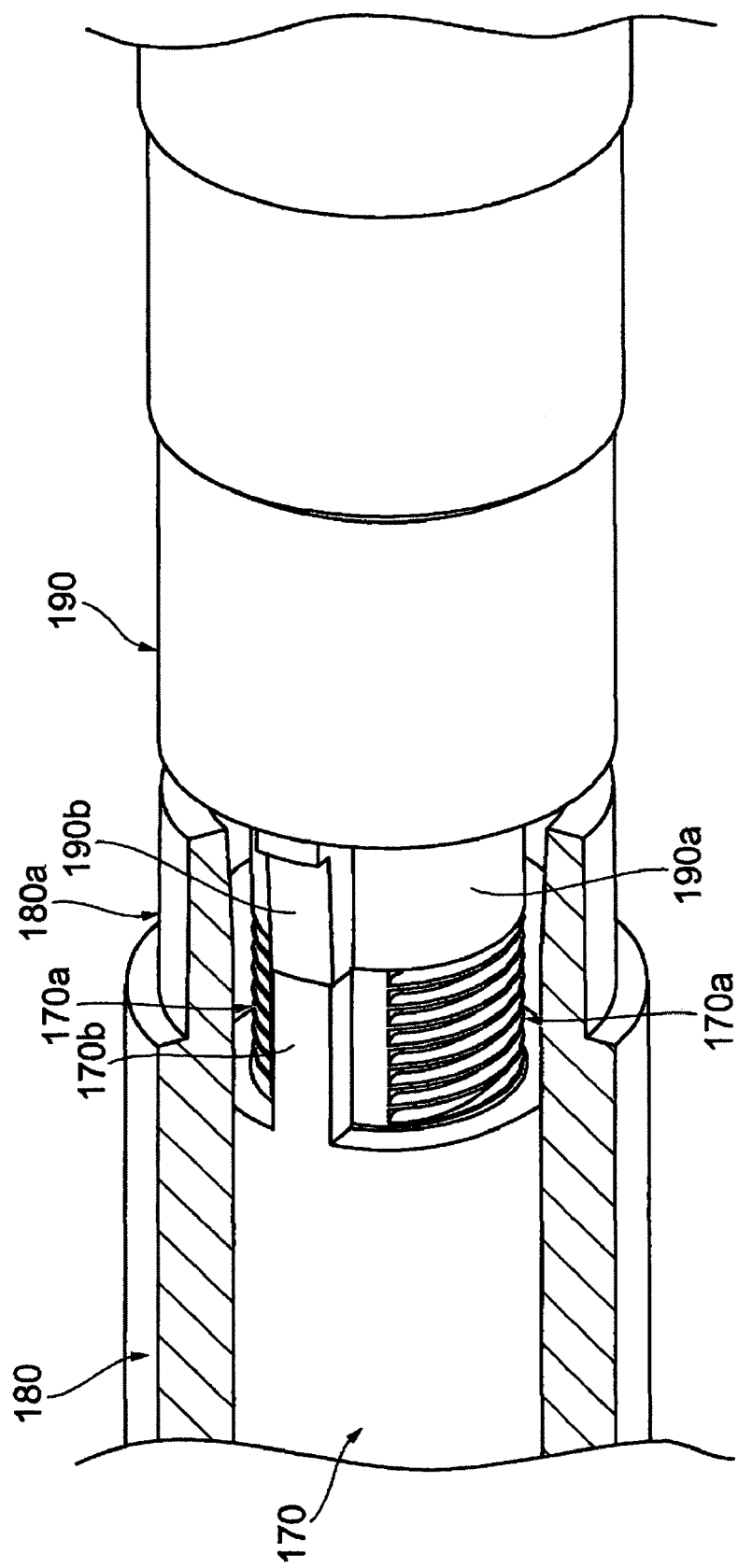
FIG. 17 is a view of a state in which a forming metal mold of the female thread member shown in FIG. 13 is set to a forming position.
Figure 18:
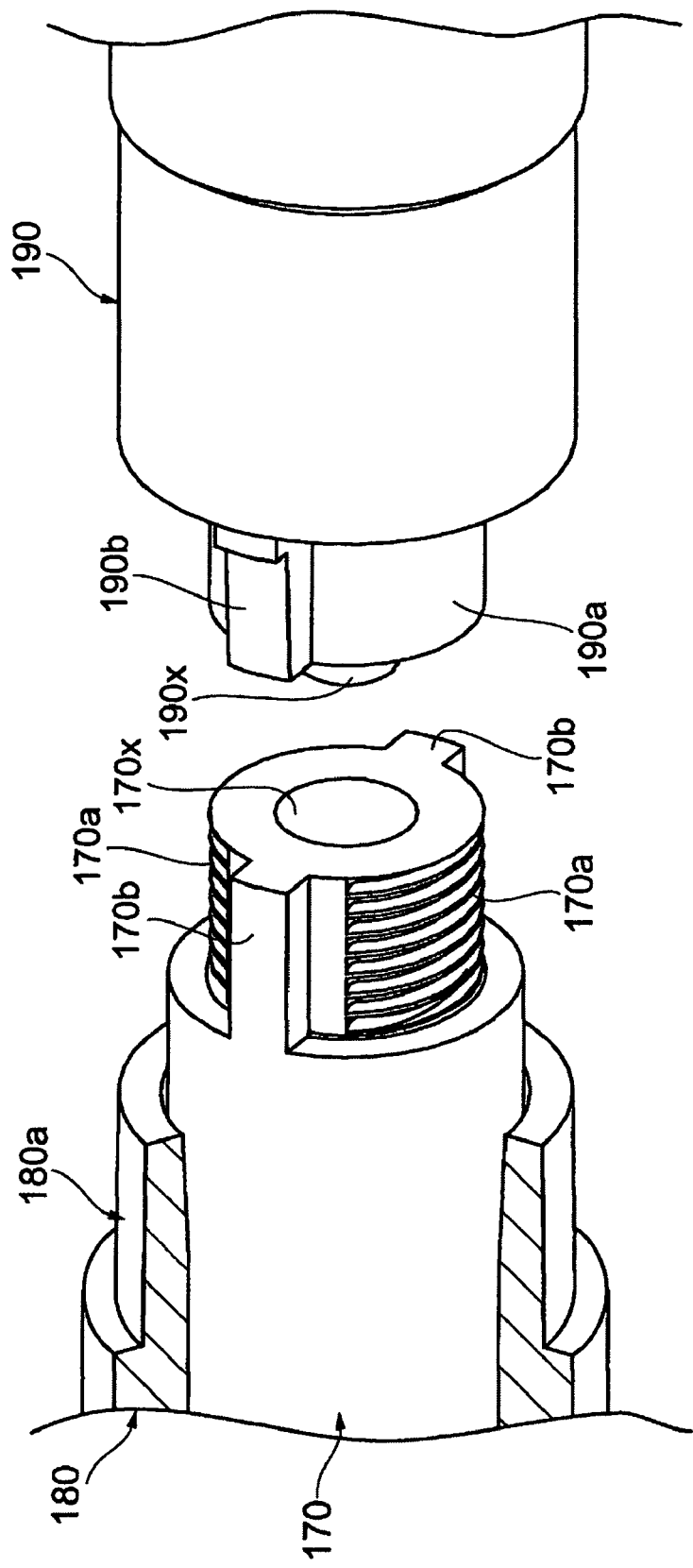
FIG. 18 is a perspective view showing a state in which the forming metal mold is released from the state in FIG. 17.

FIGS. 7 and 8 are longitudinal sectional views showing each of states of an application material extruding container in accordance with a second embodiment of the present invention, FIGS. 9 and 10 are views showing a main body tube and a rotation stop member, FIGS. 11 and 12 are views showing the rotation stop member, FIGS. 13 to 16 are views showing a female thread member, and FIGS. 17 and 18 are views for explaining a forming method of the female thread member.

As shown in FIGS. 7 and 8, an application material extruding container 200 is provided with a main body tube 101 constructing a container rear portion, and a filling member 104 constructing a container front portion as an outer shape structure, and a rotation stop member 116, a female thread member 105, a movable body 106 and a piston 107 are approximately provided within the container.

In specific, the main body tube 101 is structured in a closed-end tubular shape as shown in FIG. 9, and is provided with engagement pawl pieces 101a protruding toward a front side at a bottom portion thereof. The engagement pawl pieces 101a are provided at four uniformly arranged positions along a peripheral direction around an axis at the bottom portion of the main body tube 101, and pawl portions 101c bulging outward in a radial direction are provided as a structure for installing the rotation stop member 116 at leading end portions of the engagement pawl pieces 101a. Concave portions 101b expanding to an outer side in the radial direction and concaved toward a rear side in the axial direction are provided at a bottom portion at an outer side in the radial direction of root portions of the engagement pawl pieces 101a, and the engagement pawl pieces 101a are structured such as to have flexibility in the radial direction.

The rotation stop member 116 is integrally formed, for example, in accordance with an injection molding by using a flexible material such as a synthetic resin or the like, and is structured, as shown in FIGS. 11 and 12, such as to be provided with a main body portion 116x structured in a closed-end tubular shape, and a shaft body 116y provided in a rising manner so as to extend toward the leading end side, in the center of a bottom portion of the main body portion 116x.

A rear half portion of the main body portion 116x is formed as a cylinder portion 116z, and openings 116a for allowing the engagement pawl pieces 101a of the main body tube 101 to enter thereinto and engaging the engagement pawl pieces 101a in the rotating direction around the axis of the rotation stop member 116 are opened in a bottom 116r at positions corresponding to the engagement pawl pieces 101a.

Further, the main body portion 116x is provided four slits 116b extending to an inner side in a parallel state from positions in a peripheral edge of the bottom 116r at both sides of a pair of opposing openings 116a and 116a, and has notch-shaped portions 116d provided at a front side than the bottom portions 116c in such a manner as to separate the bottom portions 116c between the adjacent slits 116b from the cylinder portion 116z in the axial direction and continuously provided to the adjacent slits 116b. The bottom portions 116c are formed as peninsular portions which are supported by the other portions 116p than the bottom portions 116c and the slits 116b in the peripheral edge of the bottom 116r in such a manner as to have flexibility. Circular arc-shaped portions 116s protruding rearward are provided in peripheral edge portions of rear end surfaces of the peninsular portions 116c.

Further, as shown in FIG. 12, a plurality of click teeth 116f which are protrusions protruding to an inner side (an axial side) and extending in the axial direction are provided on an inner peripheral surface in the middle in the axial direction of the cylinder portion 116z of the main body portion 116x along a peripheral direction. The click teeth 116f are provided for click engaging with the female thread member 105 in the rotating direction around the axis.

Further, a front side annular step surface 116g is provided on an inner peripheral surface of a rear peripheral wall of a front half portion of the main body portion 116x, a rear side annular step surface 116h is provided at a rear position than the front side annular step surface 116g, and an inner peripheral surface of the main body portion 116x is formed smaller in diameter toward a rear side via the annular step surfaces 116g and 116h. Further, a pair of front side openings 116i communicating inner and outer sides are provided in a rear peripheral wall in the front half portion of the main body portion 116x so as to oppose to each other, and a pair of rear side openings 116j communicating inner and outer sides are provided at positions which are spaced to the rear side of a pair of front side openings 116i so as to oppose to each other. The front side openings 116i are opened such that rear end surfaces thereof are connected in a flush manner to a part of the front side annular step surface 116g, and the rear side openings 116j are opened such that rear end surfaces thereof are connected in a flush manner to a part of the rear side annular step surface 116h.

Further, front side circular arc-shaped convex portions (engagement portions) 116k protruding to an inner side (an axial side) are provided on peripheral wall portions extending along inner edges at a leading end side of the front side openings 116i, and rear side circular arc-shaped convex portions 116m protruding to an inner side are provided on peripheral wall portions extending along the inner edges at the leading end side of the rear side openings 116j. The front side circular arc-shaped convex portions 116k are provided for engaging the filling member 104 in the axial direction so as to be relatively rotatable, and the rear side circular arc-shaped convex portions 116m and the rear side annular step surface 116h are provided for engaging the female thread member 105 in the axial direction so as to be relatively rotatable.

A plurality of the protrusions 116e provided along the peripheral direction on the shaft bodies 116y so as to extend in the axial direction are formed as a rotation stop constructing one part of the rotation stop portion (the rotation stop mechanism) 150.

Further, in a state in which the rotation stop member 116 is inward inserted to the main body tube 101 as shown in FIG. 9, and the circular arc-shaped convex portions 116s of the rotation stop member 116 is brought into contact with the bottom of the main body tube 101 as shown in FIG. 10, the pawl portions 101c enter into the openings 116a of the rotation stop member 116 and the pawl portions 101c pass through the openings 116a of the rotation stop member 116 while the engagement pawl pieces 101a of the main body tube 101 is bent to the inner side (the axial side) as shown in FIGS. 9 and 10. Then, the engagement pawl pieces 101a are returned to the original positions in accordance with their flexibility, the pawl portions 101c are brought into close contact with the front side surface of the bottom 116r of the rotation stop member 116 so as to engage the rotation stop member 116 in the axial direction, and the engagement pawl pieces 101a are engaged with the openings 116a of the rotation stop member 116 in the rotating direction around the axis. Accordingly, the rotation stop member 116 is installed to the main body tube 101 so as to be synchronously rotatable and be incapable of breaking away in the axial direction, and is integrated.

In this case, since the peninsular portions 116c of the rotation stop member 116 is structured such as to have flexibility in the axial direction on the basis of the provision of the notch-shaped portions 116d and the slits 116b in the rotation stop member 116, the peninsular portions 116c are pressed to the main body tube 101 side by the pawl portions 101c of the main body tube 101 so as to be prevented from rattling.

The movable body 106 is structured approximately in a cylindrical shape, and is provided with a collar portion 106a on an outer peripheral surface at a leading end side, as shown in FIG. 7. Further, the movable body 106 has a male thread 106b constructing one part of an engagement portion (an engagement mechanism) 109 on an outer peripheral surface at a rear side than the collar portion 106a along the axial direction, and has a plurality of protrusions 106d arranged so as to radially protrude to an inner side and extending in the axial direction as a rotation stop constructing the other of a rotation stop portion (a rotation stop mechanism) 150 on an inner peripheral surface.

The movable body 106 is outward inserted to the shaft body 116y of the rotation stop member 116, and the protrusions 106d enter into portions between the protrusions 116e and 116e of the shaft body 116y of the rotation stop member 116 so as to engage in the rotating direction around the axis, and is installed to the rotation stop member 116 so as to be synchronously rotatable and be movable in the axial direction.

The piston 107 is installed to the leading end portion of the movable body 106 via a piston support member 108 so as to be immovable in the axial direction.

The female thread member 105 characterizes the present embodiment. For example, the female thread member 105 is integrally formed in accordance with the injection molding by using a flexible material such as synthetic resin or the like. As shown in FIGS. 13 to 16, the female thread member 105 is integrally provided with an outer tube 105a structured in an approximately cylindrical shape, an inner tube 105b arranged in an inner side at a leading end side of the outer tube 105a so as to be approximately coaxial with the outer tube 105a and structured in an approximately cylindrical shape, and an annular coupling portion 105x continuously provided at a leading end side of the outer tube 105a and a rear end of the inner tube 105b and coupling them. Accordingly, a space portion 105y which is open to one side (a left side in the figure) in the axial direction is annularly provided between the outer tube 105a and the inner tube 105b.

A plurality of protrusions (engagement portions) 105f extending in the axial direction are provided as a structure for engaging with a filling member 104 in the rotating direction around the axis on an outer peripheral surface of the leading end portion of the outer tube 105a of the female thread member 105 along the peripheral direction.

Further, the inner tube 105b of the female thread member 105 is provided with a pair of slits 105n at both sides with respect to the axis. The slits 105n communicate inner and outer sides in a diametrical direction and extend in the axial direction while leading ends thereof being open to one side (the front side) in the axial direction and a rear ends thereof being open to the other side. A female thread 105j constructing the other part of the engagement portion (engagement mechanism) 109 is formed on an inner peripheral surface of the front half portion of the inner tube 105b separated into two sections by the slits 105n and 105n from one side in the axial direction, and is provided in such a manner as to be separated into a semicircular arc shape by the slits 105n and 105n.

Further, a collar portion 105c is provided on an outer peripheral surface in the middle in the axial direction of the outer tube 105a of the female thread member 105. The collar portion 105c is provided for engaging with the circular arc-shaped convex portions 116m at a rear side of the rotation stop member 116 and the annular step surface 116h at the rear side in the axial direction. A groove portion 105m for installing an O-ring 111 shown in FIG. 7 is provided on an outer peripheral surface at the rear side than the collar portion 105c.

Further, a rear side than the groove portion 105m of the outer tube 105a of the female thread member 105 is formed as a cylinder portion 105t having click teeth 105s. Specifically, click tooth bases 105q have the click teeth 105s extending in the axial direction and formed in a chevron cross sectional shape having a ascending slope and a descending slope. The click tooth bases 105q are arranged respectively at a plurality of openings 105p provided along a peripheral direction of the cylinder portion 105t, and are structured such as to be supported by support portions 105r protruding from peripheral surfaces of openings 105p so as to have flexibility in a radial direction.

Further, the female thread member 105 is outward inserted to the movable body 106 and inward inserted to the rotation stop member 116 as shown in FIG. 7. In a state in which the female thread 105j of the inner tube 105b is engaged with the male thread 106b of the movable body 106, the leading end surface of the inner tube 105b is confronted with a rear end surface of the collar portion 106a of the movable body 106, and the collar portion 105c of the outer tube 105a enter into a portion between the circular arc-shaped convex portions 116m at the rear side of the rotation stop member 116 and the annular step surface 116h at the rear side so as to be engaged with the rotation stop member 116 in the axial direction. Accordingly, the female thread member 105 is installed to the rotation stop member 116 so as to be relatively rotatable and be immovable in the axial direction. In this state, the click teeth 105s of the female thread member 105 and the click teeth 116f of the rotation stop member 116 are set to a state in which they can be click-engaged in the rotating direction around the axis. In other words, the cylinder portion 105t of the female thread member 105 and the cylinder portion 116z of the rotation stop member 116 are structured such as to have an overlap section, in which they overlap in the axial direction and the click teeth 105s and 116f click-engage, in the axial direction. These click teeth 105s and 116f allow the main body tube 101 and the filling member 104 to relatively rotate in one direction and the other direction.

Further, an O-ring 111 is fitly attached to the groove portion 105m of the female thread member 105, and a better rotational resistance is generated in the filling member 104 coupled to the female thread member 105 and the main body tube 101 coupled to the rotation stop member 116 on the basis of the O-ring 111.

The filling member 104 is formed in a cylindrical shape and is formed in a shape that a leading end is closed, and an application material L is filled in a filling region 104x in the inner portion. An outer surface of a leading end portion of the filling member 104 is formed as an application portion, and the application portion is provided with a discharge port (an opening) 104c communicating inner and outer sides.

A rear end portion of the filling member 104 is provided with an annular groove portion 104a for engaging with circular arc-shaped concave portions 116k at a front side of the rotation stop member 116 in the axial direction. Further, an inner peripheral surface of a rear end portion of the filling member 104 is provided with a knurling 104e which extends to a leading end side in the axial direction over a predetermined length and is densely provided with concavities and convexities in parallel along the peripheral direction, as a structure for engaging with the protrusions 105f of the female thread member 105 in the rotating direction around the axis.

The filling member 104 is inward inserted to the rotation stop member 116 and outward inserted to the leading end portion of the female thread member 105 at a rear portion thereof, and the protrusions 105f of the female thread member 105 are engaged with the knurling 104e in the rotating direction around the axis, whereby the filling member 104 is installed to the female thread member 105 so as to be synchronously rotatable. Further, since the annular groove portion 104a is engaged with the circular arc-shaped convex portions 116k at the front side of the rotation stop member 116 in the axial direction, the filling member 104 is installed to the rotation stop member 116 so as to be relatively rotatable and be immovable in the axial direction. In other words, the filling member 104 and the female thread member 105 are structured such as to be relatively rotatable and be immovable in the axial direction with respect to the main body tube 101. Further, a cap 110 is detachably installed to a leading end of the rotation stop member 116, and the filling member 104 is covered by the cap 110 so as to be protected.

Further, the engagement portion (the engagement mechanism) 109 is structured by the female thread 105j of the female thread member 105 and the male thread 106b of the movable body 106, the rotation stop portion (the rotation stop mechanism) 150 is structured by the protrusions 116e of the rotation stop member 116 and the protrusions 106d of the movable body 106, and the click mechanism is structured by the click teeth 105s of the female thread member 105, the click teeth 116f of the rotation stop member 116 and the support portions 105r having flexibility in the rotation stop member 116.

In the application material extruding container 200 structured as mentioned above, when the cap 110 is detached by a user and the main body tube 101 and the filling member 104 are relatively rotated in the feed-out direction, an engaging action of the engagement portion 109 is activated, the movable body 106 and the piston 107 move forward as shown in FIG. 8 on the basis of a cooperation with the rotation stop portion 150, and the application material L appears from the discharge port 104c of the filling member 104 so as to be set to a use state.

At a time of the forward movement of the movable body 106, the click teeth 105s of the female thread member 105 and the click teeth 116f of the rotation stop member 116 repeat engagement and disengagement in the rotating direction, a click feeling is generated, a degree of the relative rotation and a forward moving degree of the movable body 106 are sensed by a user, and the application material L can be suitably extruded, whereby it is possible to prevent the application material L from protruding too much.

When the main body tube 101 and the filling member 104 are relatively rotated in the feed-back direction after being used, the engagement action of the engagement portion 109 is actuated, and the movable body 106 and the piston 107 are moved backward on the basis of a cooperation with the rotation stop portion 150.

At a time of the backward movement of the movable body 106, the click teeth 105s of the female thread member 105 and the click teeth 116f of the rotation stop member 116 repeat engagement and disengagement in the rotating direction, the click feeling is generated, the degree of the relative rotation and the backward moving degree of the movable body 6 are sensed by the user, and it is possible to prevent the movable body 106 from being returned too much on the basis of the click feeling. In this case, a predetermined space is formed in the inner side than the discharge port 104c of the filling member 104 on the basis of the backward movement of the movable body 106.

Further, in the case that the application material L remains within the filling member 104, the main body tube 101 and the filling member 104 are relatively rotated in the feed-out direction by a user to set the application material L in a use state, the same motion as mentioned above is thereafter carried out repeatedly.

Next, a description will be given of a forming method of the female thread member 105 having the structure mentioned above with reference to FIGS. 17 and 18. First, as shown in FIGS. 17 and 18, there are prepared metal molds comprising: a first core pin 170, that is, an inner mold which is structured in a columnar shape and has semicircular arc-shaped male threads 170a and 170a extending in an axial direction in correspondence to the female thread 105j on the inner peripheral surface of the inner tube 105b and convex portions 170b positioned between the male threads 170a and 170a in the peripheral direction and extending in the axial direction in correspondence to the slits 105n on an outer peripheral surface of a leading end portion; a middle mold 180 which is provided with an annular convex portion 180a corresponding to an annular space portion 105y between the inner peripheral surface of the outer tube 105a and the outer peripheral surface of the inner tube 105b at a leading end portion thereof; a second core pin 190 which has a shape corresponding to the inner peripheral surface of the outer tube 105a at the other side (a right side in the figure) than the coupling portion 105x on an outer peripheral surface, has a columnar convex portion 190a corresponding to the inner peripheral surface at the other side than the female thread 105j of the inner tube 105b in the center of the leading end, and has convex portions 190b provided on the outer peripheral surface of the convex portion 190a and extending in the axial direction in correspondence to the slits 105n; and an outer mold (not shown) which has a shape corresponding to the outer peripheral surface of the outer tube 105a on an inner peripheral surface thereof.

In this case, in order to avoid a complication of the figures, the outer mold and a molded product after the resin is solidified are omitted in FIGS. 17 and 18.

Further, as shown in FIG. 17, the core pins 170 and 190 are confronted with each other by inserting the first core pin 170 and the medium mold 180 from one side of the outer mold, and inserting the second core pin 190 from the other side at the opposite side in the axial direction to the one side of the outer mold. At this time, as shown in FIG. 18, a concave portion 170x having a circular cross sectional shape provided in a concave manner in the center of a leading end surface of the first core pin 170 is fitted to a columnar protruding portion 190x provided in a protruding manner in the center of a leading end surface of the second core pin 190, and the core pins 170 and 190 are accurately positioned with each other.

In this state, as shown in FIG. 17, a leading end surface of the male threads 170a of the first core pin 170 is brought into contact with a leading end surface of the convex portion 190a of the second core pin 190, a leading end surface of the convex portion 170b of the first core pin 170 is brought into contact with a leading end surface of the convex portion 190b of the second core pin 190, a space for forming the inner tube 105b is formed in a region surrounded by outer peripheral surfaces of the male threads 170a of the first core pin 170, an outer peripheral surface of the convex portion 190a of the second core pin 190, and an inner peripheral surface of the convex portion 180a of the middle mold 180, and a region except the convex portion 170b of the first core pin 170 and the convex portion 190b of the second core pin 190, a space for forming the coupling portion 105x is formed between the leading end surface of the convex portion 180a of the middle mold 180 and the second core pin 190, and a space for forming the outer tube 105a is formed between the outer peripheral surface of the convex portion 180a of the middle mold 180, the outer peripheral surface of the second core pin 190 and the inner peripheral surface of the outer mold.

Next, molten resin is flowed into the space, that is, the gap between the molds, and a mold release is carried out after the molten resin is solidified. The mold release is carried out by sequent steps of drawing out the middle mold 180 to one side, thereafter drawing out the first core pin 170 to one side and drawing out the second core pin 190 to the other side, as shown in FIG. 18, and separating the outer mold, in the same manner as the first embodiment.

Further, since the middle mold 180 has been already drawn out to the one side and the inner tube 105b is not prevented from expanding to the outer side in the diametrical direction, at a time of drawing out the first core pin 170 to one side, the inner tube 105b is expanded to the outer side in the diametrical direction by the slits 105n (refer to FIG. 15) of the inner tube 105b, and it is possible to draw out the first core pin 170 without breaking the female thread 105j, in the same manner as the first embodiment.

As mentioned above, in the present embodiment, the female thread member 105 is structured by integrally forming the outer tube 105a, and the inner tube 105b approximately coaxially formed with the outer tube 105a and positioned in the inner side, and is structured such as to be provided with the space portion 105y which is open to one side in the axial direction and formed in the annular shape, the female thread 105j which is provided in the inner peripheral surface of the inner tube 105b and is formed from one side in the axial direction so as to extend in the axial direction, and the slits 105n which communicate the inner and outer sides in the diametrical direction and extend in the axial direction so as to be open to one side, between the outer tube 105a and the inner tube 105b. Accordingly, there is employed the forming method mentioned above, that is, the method of drawing out the middle mold 180 corresponding to the annular space portion 105y between the outer tube 105a and the inner tube 105b to one side, and thereafter drawing out the first core pin 170 having the male threads 170a corresponding to the female thread 105j of the inner tube 105b to one side by utilizing elasticity generated by the slits 105n which are open to one side of the inner tube 105b. It is possible to draw out the first core pin 170 without preventing the inner tube 105b from expanding to the outer side in the diametrical direction and without breaking the female thread 105j by drawing the middle mold 180 prior to the first core pin 170 as mentioned above. Therefore, it is possible to provide the application material extruding container 200 provided with the female thread member 105 having the novel structure which can reduce the manufacturing cost and can improve the productivity.

Figure 14:
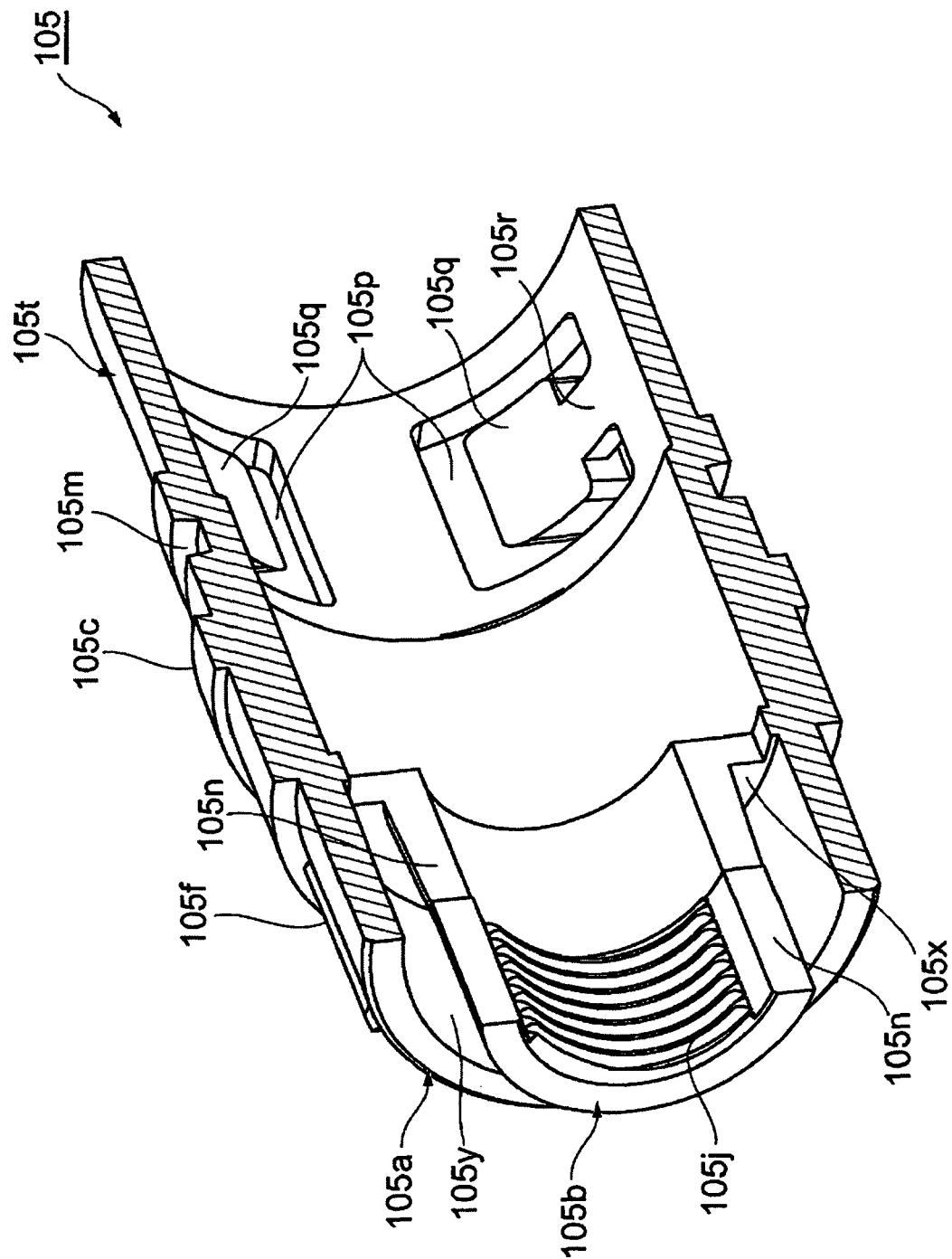
FIG. 14 is a longitudinal sectional perspective view of the female thread member shown in FIG. 13.
Figure 15:
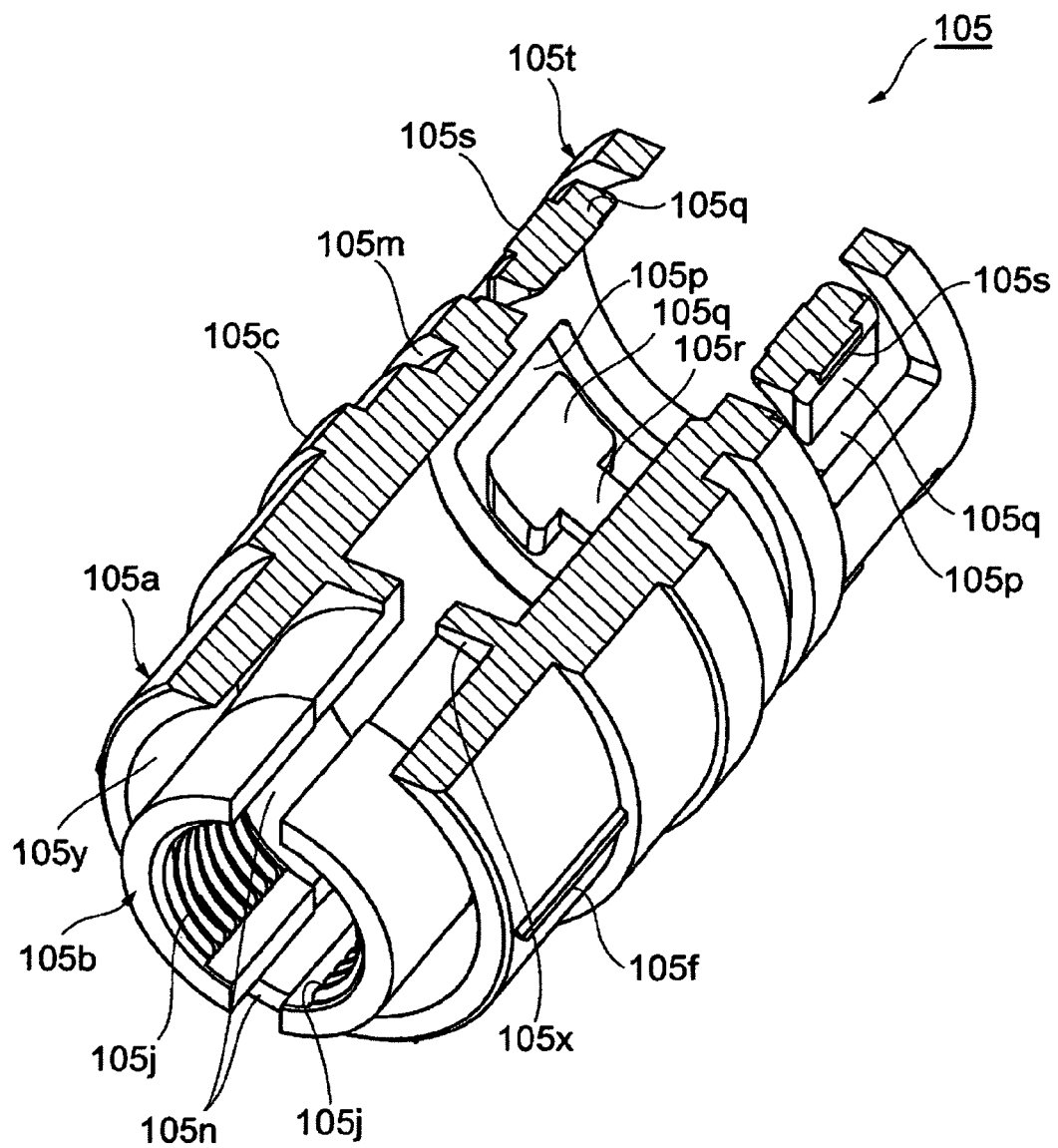
FIG. 15 is a breakaway perspective view of the female thread member shown in FIG. 13.
Figure 16:
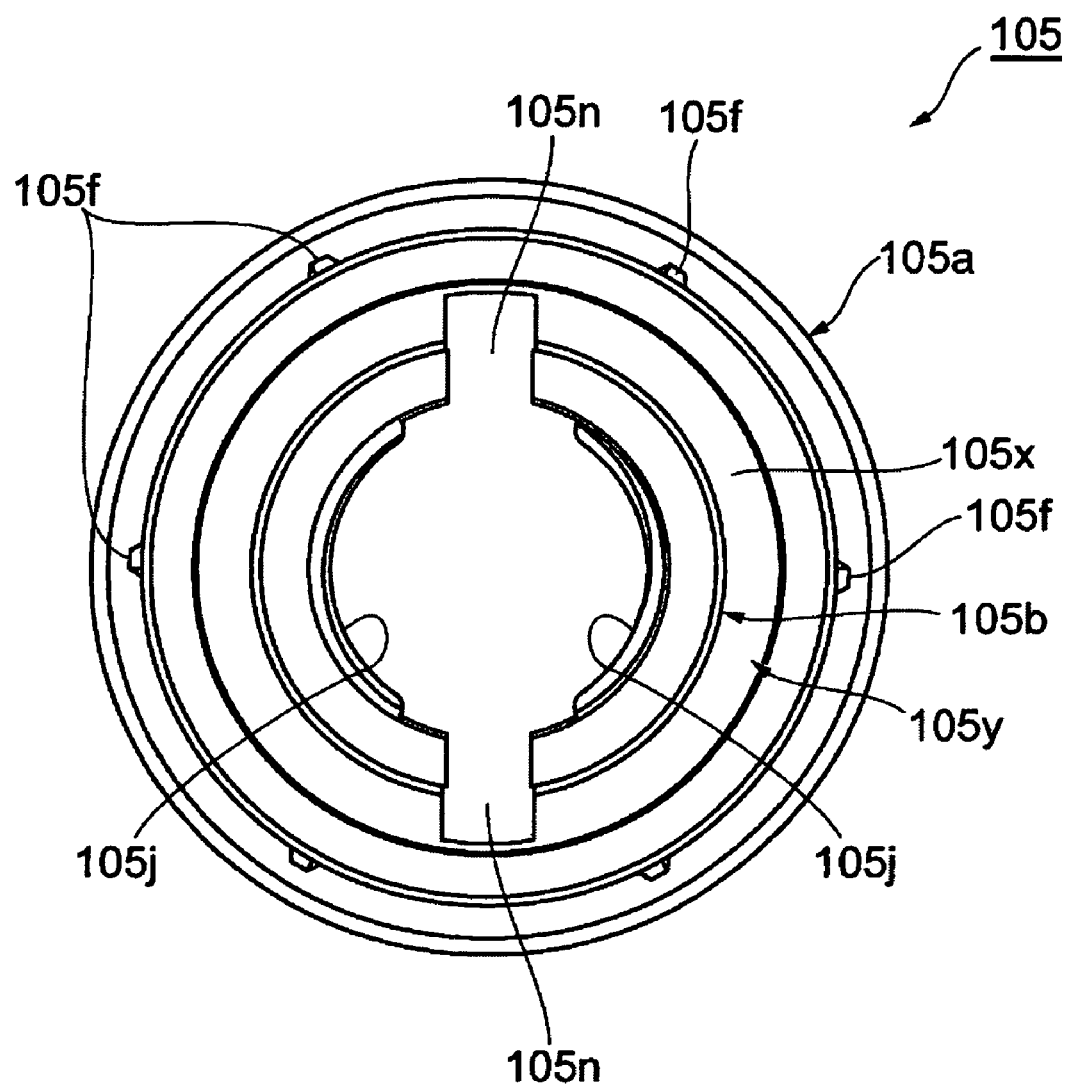
FIG. 16 is a left side view of the female thread member shown in FIG. 13.

Further, in the female thread member 105, as shown in FIG. 14, since the end portions at the other side of the slits 105n, and the coupling portion 105x continuously provided with the outer tube 105a and the inner tube 105b so as to integrate them are positioned in the other side than the end portion at the other side of the female thread 105j, it is possible to promote the expansion to the outer side in the diametrical direction of the inner tube 105b by the slits 105n at a time of drawing out the first core pin 170 to one side, and it is possible to easily draw out the first core pin 170 without breaking the female thread 105j.

In this case, in the present embodiment, a part (a rear side portion than the leading end portion) of the inner tube 105b is positioned within the outer tube 105a and the leading end portion of the inner tube 105b protrudes from the outer tube 105a, however, the whole of the inner tube 105b may be positioned within the outer tube 105a.

Further, the click teeth 105s and 116f may be formed as the ratchet teeth as in the first embodiment, thereby allowing only the relative rotation in one direction for feeding out the movable body 4.

Figure 19:
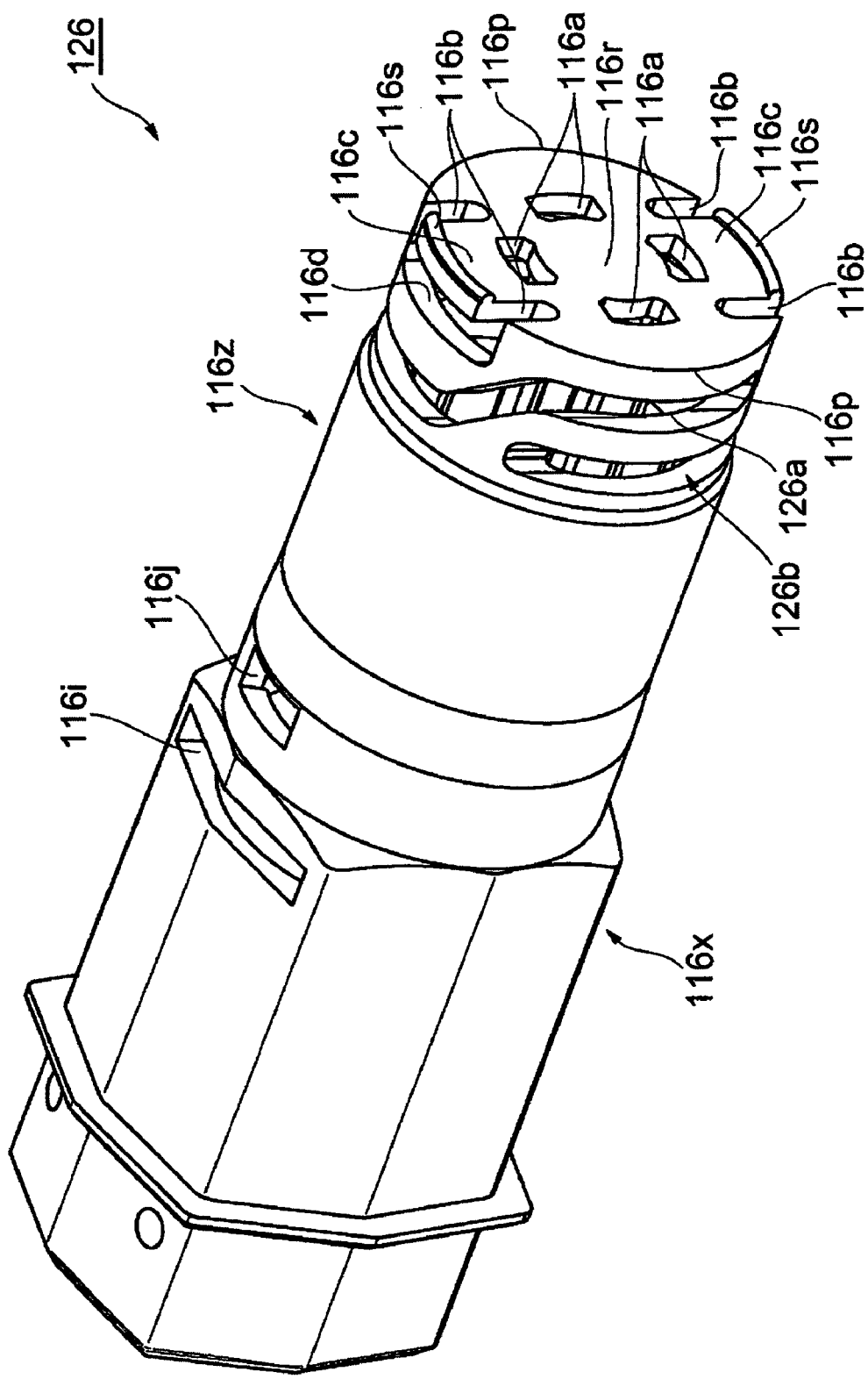
FIG. 19 is a perspective view showing another rotation stop member.
Figure 20:
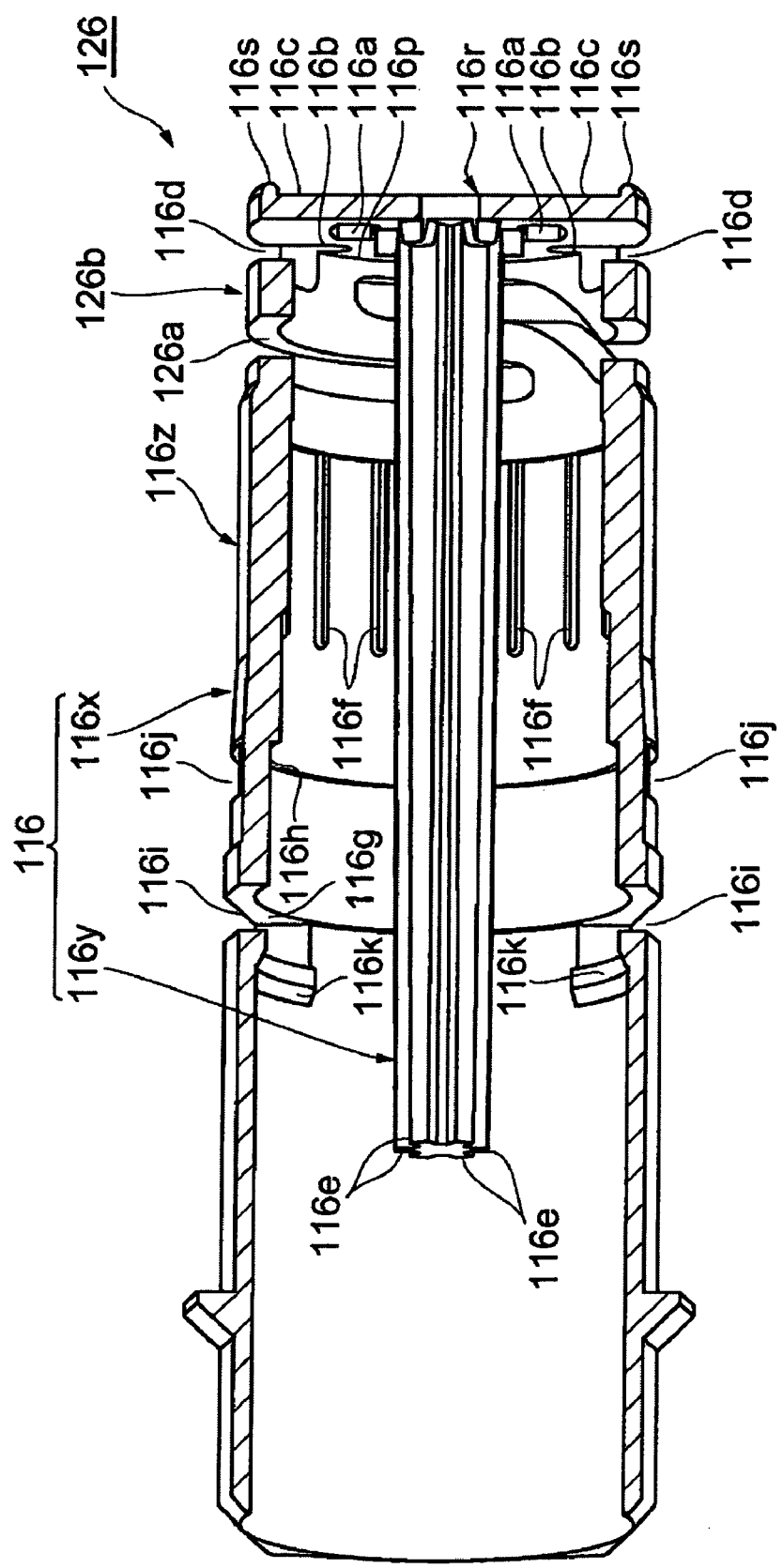
FIG. 20 is a breakaway front view of the rotation stop member shown in FIG. 19.

FIG. 19 is a perspective view showing another rotation stop member, and FIG. 20 is a broken front view of the rotation stop member shown in FIG. 19.

A rotation stop member 126 is different from the rotation stop member 116 shown in FIGS. 11 and 12 in a point that a spring 126b is structured by providing a spiral slit 126a in a cylinder portion 116z of a main body portion 116x, and a bottom 126r is supported so as to have flexibility. In this case, the rotation stop member 126 is integrally formed, for example, in accordance with the injection molding by using a flexible material such as synthetic resin or the like, in the same manner as the second embodiment.

In accordance with the application material extruding container having the rotation stop member 126, in the case that an external shock is applied, for example, by dropping the container from the leading end side in a state of putting the cap 110 thereon, the shock is relaxed by the flexibility in the pulling direction or the compressing direction generated by the spring 126b, and it is possible to prevent the filling member 104 and the rotation stop member 126 from coming off, prevent the application material L from leaking, and prevent each of the portions from being broken.

In this case, the description is given of the filling material extruding containers 100 and 200 which are particularly preferable in the case that the application material L is constituted, for example, by a kneaded state semisolid material and a soft solid material including the liquid state, the jelly state, the gel state and the paste state. However, in the following third embodiment, a description will be given of an application material extruding container 300 which is preferable in the case that the application material M is constituted, for example, by various stick-shaped cosmetic materials in addition to a lip stick, a lip gross, an eye liner, an eye color, an eyebrow, a lipliner, a cheekliner, a concealer, a beautystick, a hair color and the like, and a stick-shaped color for a writing instrument or the like, and is particularly preferable in the case that the application material M is constituted by a very soft (semisolid, soft solid, soft, jelly-like and mousse-like) stick-shaped material.

Figure 21:
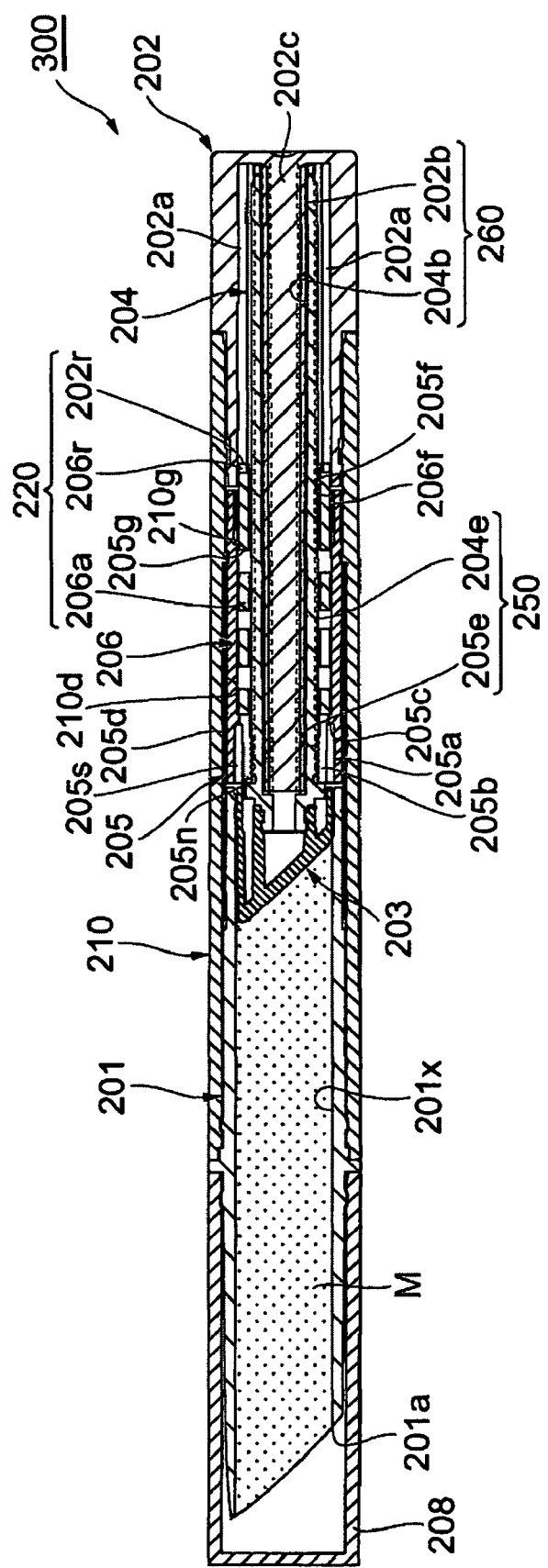
FIG. 21 is a longitudinal sectional view showing an initial state of an application material extruding container in accordance with a third embodiment of the present invention.
Figure 22:
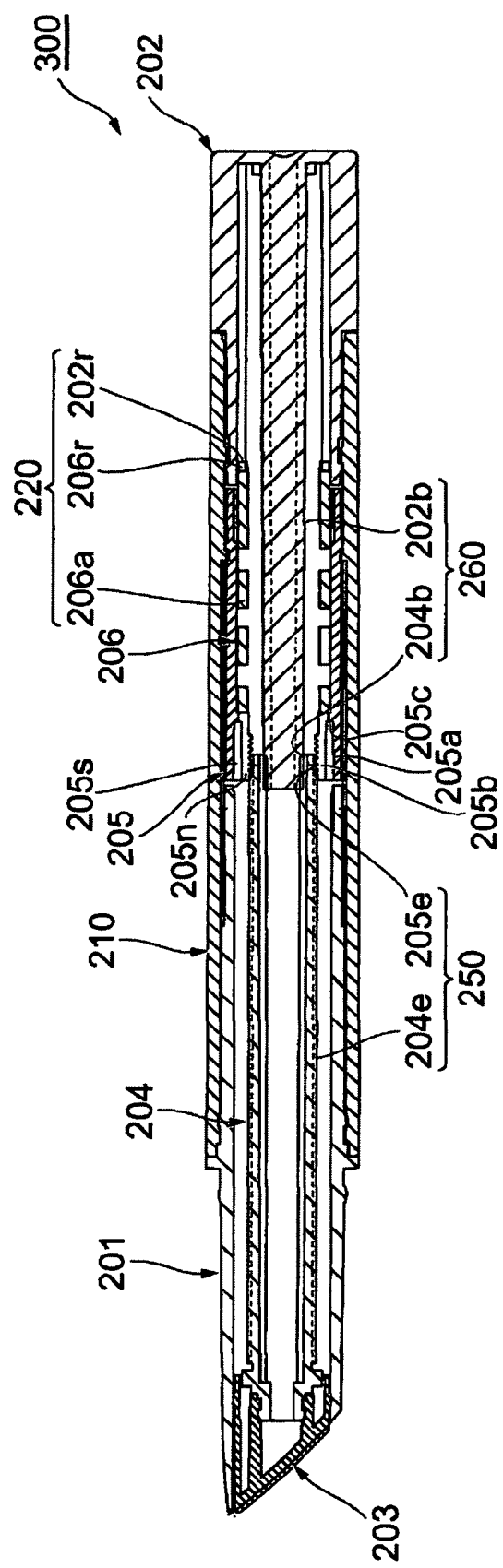
FIG. 22 is a longitudinal sectional view at a time when a movable body of the application material extruding container shown in FIG. 21 moves forward to the maximum.
Figure 23:
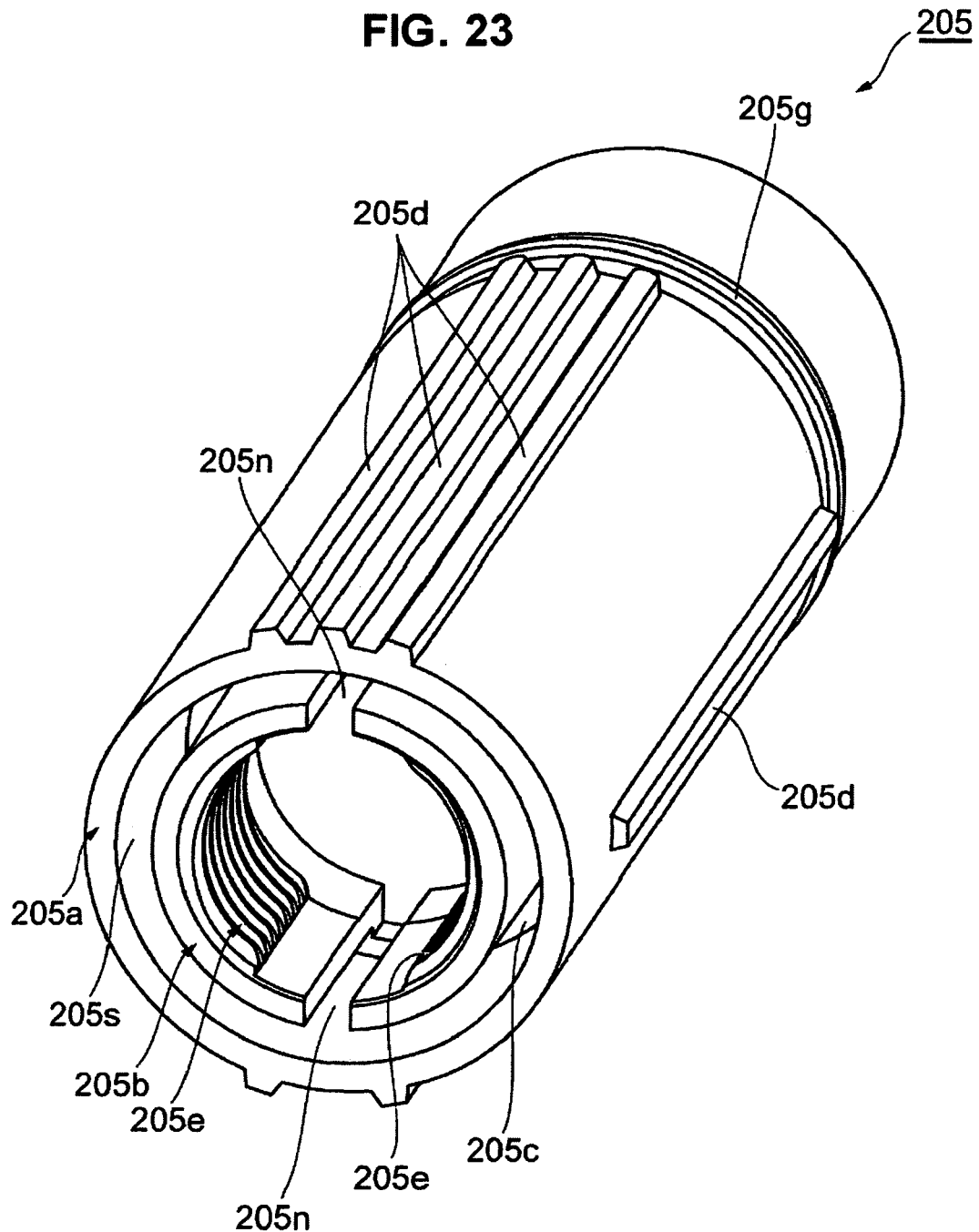
FIG. 23 is a perspective view showing a female thread member in FIGS. 21 and 22.
Figure 24:
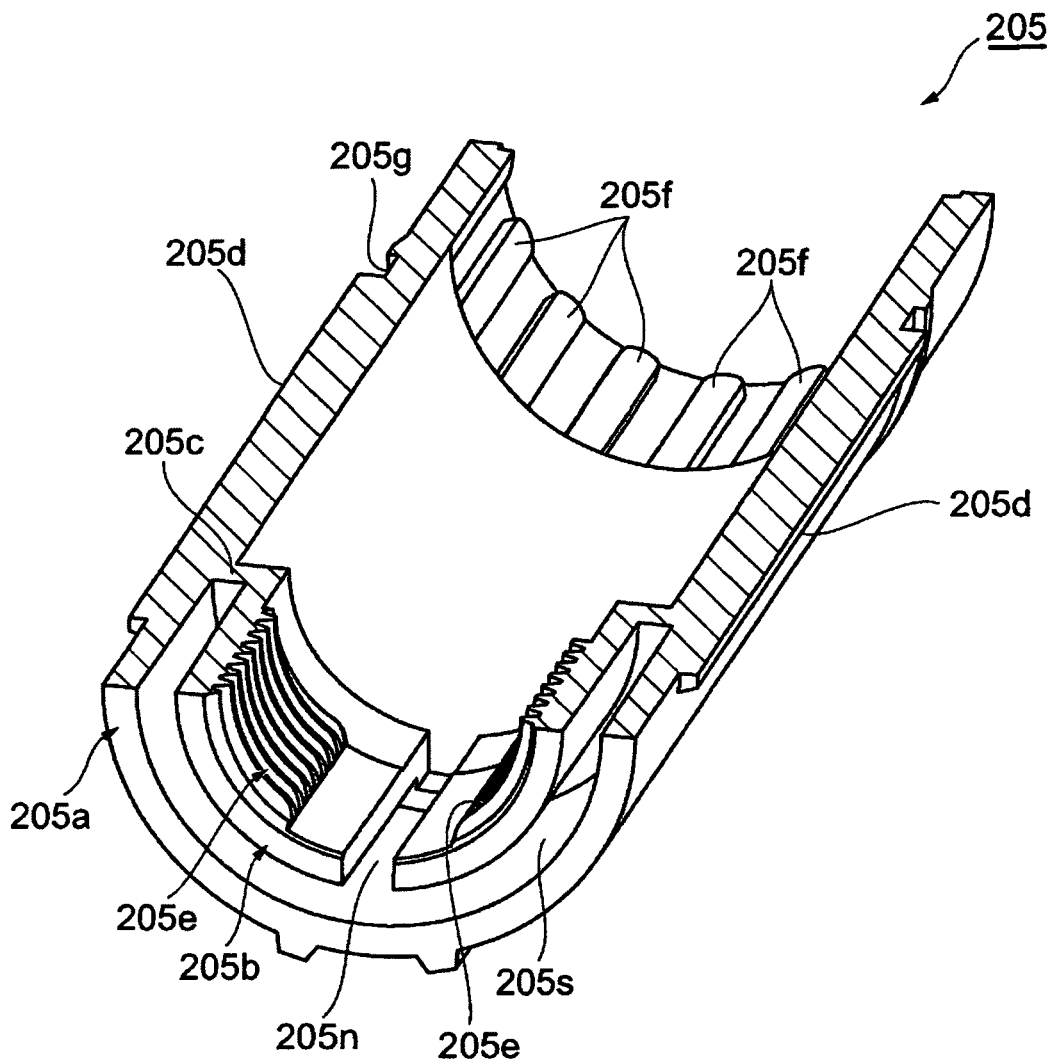
FIG. 24 is a longitudinal sectional view of the female thread member shown in FIG. 23.

FIGS. 21 and 22 are longitudinal sectional views showing respective states of an application material extruding container in accordance with a third embodiment of the present invention, and FIGS. 23 and 24 are views showing a female thread member.

An application material extruding container 300 in accordance with this embodiment is provided with a cylindrical filling member (a leading tube) 201 constructing a container front portion and having a filling region 201x to be filled with the application material M in an inner portion, a cylindrical main body tube 210 engaging with the filling member 201 in a rotating direction around an axis and engaging with the filling member 201 in an axial direction, and being installed to the filling member 201 so as to be synchronously rotatable and be immovable in the axial direction, and a closed-end cylindrical operation tube 202 constructing a container rear portion, engaging with the main body tube 210 in the axial direction and being installed so as to be relatively rotatable and be immovable in the axial direction, as an outer shape structure, as shown in FIG. 21.

Further, the filling member 201 is structured such as to slidably accommodate the application material M in the filling region 201x in the inner portion in a close contact state. The application material M may be filled within the filling member 201 by injecting a forming material in a molten state into the filling member 201 and cooling it to solidify, or may be filled by fitly inserting the previously manufactured application material M to the filling member 201.

Within the container, there are arranged a movable body 204 provided with a piston 203 at a leading end portion for extruding the application material M, a female thread member 205 for forward and backward moving the movable body 204, and a click spring member 206 for giving a click feeling at a time when the movable body 204 moves forward and backward.

The movable body 204 is formed in a cylindrical shape, and is provided with a male thread 204e over an approximately whole length of an outer peripheral surface. Further, since a plurality of protrusions 204b provided on an inner periphery surface of the movable body 204 so as to radially protrude to an inner side enter into a portion between a plurality of protrusions 202b and 202b provided on an outer peripheral surface of a shaft body 202c, which is provided in a rising manner at a bottom of the operation tube 202, so as to radially protrude to an outer side and engage in a rotating direction around an axis, the movable body 204 is structured such as to be synchronously movable and be immovable in the axial direction with respect to the operation tube 202.

The click spring member 206 is arranged in such a manner as to be held between an inner tube 205b (mentioned below) of the female thread member 205 positioned at a front side than the click spring member 206, and a plurality of protrusions 202a provided on an inner peripheral surface of the operation tube 202 in such a manner as to radially protrude to an inner side. The click spring member 206 is provided with click teeth 206r protruding to a rear side on a rear end surface along a peripheral direction, and a front portion than the click teeth 206r is formed as an elastic body 206a for energizing the click teeth 206r to the rear side in the axial direction, and is integrally formed with the click teeth 206r. The elastic body 206a is formed as a compression spring having a spiral slit in this case.

Further, the click teeth 206r of the click spring member 206 is energized to the rear side by the compression spring 206a, and the click spring member 206 can be engaged (can be mashed) with click teeth 202r utilizing a leading end of the protrusion 202a of the operation tube 202 in the rotating direction around the axis. These click teeth 202r and 206r have the same function as that of the second embodiment.

The female thread member 205 characterizes the present embodiment. For example, the female thread member 205 is integrally formed in accordance with the injection molding by using a flexible material such as synthetic resin or the like. As shown in FIGS. 23 and 24, the female thread member 205 is integrally provided with an outer tube 205a structured in an approximately cylindrical shape, an inner tube 205b arranged in an inner side at a leading end side of the outer tube 205a so as to be approximately coaxial with the outer tube 205a and structured in an approximately cylindrical shape, and an annular coupling portion 205c continuously provided at a leading end side of the outer tube 205a and a rear end of the inner tube 205b to couple them. Accordingly, a space portion 205s which is open to one side (a left side in the figure) in the axial direction is annularly provided between the outer tube 205a and the inner tube 205b.

The inner tube 205b of the female thread member 205 is provided with a pair of slits 205n at both sides with respect to the axis. The slits 205n communicate inner and outer sides in a diametrical direction and extend in the axial direction while a leading end thereof being open to one side (a front side) in the axial direction so as to extend in the axial direction and a rear end being open to the other side. Further, an inner peripheral surface of the inner tube 205b separated into two sections by the slits 205n and 205n is provided with a female thread 205e reaching a rear end portion from one side in the axial direction in such a manner as to be separated into semicircular arc sections by the slits 205n and 205n.

In the female thread member 205, a plurality of protrusions (engagement portions) 205d are provided on an outer peripheral surface of the outer tube 205a along the peripheral direction from the leading end side of the outer peripheral surface of the outer tube 205a to the rear end portion. Since the protrusions 205d are engaged with a knurling 210d extending at the predetermined length along the axial direction on the inner peripheral surface of the main body tube 210 and being densely provided with the concavities and convexities in parallel along the peripheral direction, in the rotating direction around the axis, as shown in FIG. 21, the female thread member 205 is synchronously rotatable with respect to the main body tube 210. Further, as shown in FIGS. 23 and 24, since an annular groove portion 205g provided on an outer peripheral surface at the rear side than the protrusions 205d of the outer tube 205a is engaged with an annular protruding portion 210g provided on an inner peripheral surface at a rear side than a knurling 210d of the main body tube 210 in the axial direction, as shown in FIG. 21, the female thread member 205 is immovable in the axial direction with respect to the main body tube 210.

Further, the female thread member 205 is provided with a plurality of protrusions 205f on the inner peripheral surface of the rear end portion of the outer tube 205a along the peripheral direction, as shown in FIG. 24. Since the protrusions 205f enter into a portion between a plurality of protrusions 206f and 206f provided on the outer peripheral surface between the click teeth 206r of the click spring member 206 and the compression spring 206a along the peripheral direction and extending at a predetermined length in the axial direction so as to be engaged in the rotating direction around the axis, as shown in FIG. 21, the female thread member 205 can synchronously rotate the click spring member 206. Accordingly, the female thread member 205 and the click spring member 206 are made synchronously rotatable with respect to the filling member 201 and the main body tube 210.

In this state, the male thread member 204e of the movable body 204 is set to a state of being engaged with the female thread 205e of the female thread member 205.

Further, an engagement portion (an engagement mechanism) 250 is structured by the female thread 205e of the female thread member 205 and the male thread 204e of the movable body 204, a rotation stop portion (a rotation stop mechanism) 260 is structured by the protrusions 202b of the operation tube 202 and the protrusions 204b of the movable body 204, and a click mechanism 220 is structured by the click teeth 202r of the operation tube 202, the click teeth 206r of the click spring member 206 and the compression spring 206a of the click spring member 206.

In the application material extruding container 300 structured as mentioned above, when a cap 208 shown in FIG. 21 is detached from the filling member 201 by a user, and the filling member 201 or the main body tube 210 and the operation tube 202 are relatively rotated in one direction, the movable body 204 is gradually fed out to the leading end side in accordance with the relative rotation as shown in FIG. 22 while a click feeling generated by the click mechanism 220 is given to the user, and the application material M in the filling region 201x is gradually extruded to the leading end side by the piston 203 at the leading end of the fed-out movable body 204, and appears from an opening 201a at the leading end of the filling member 201 so as to be set to a use state.

When the filling member 201 or the main body tube 210 and the operation tube 202 are relatively rotated in the other direction after the use, the movable body 206 and the piston 203 are moved backward. At this time, since the piston 203 and the application material M are closely attached to the inner peripheral surface of the filling member 201, and the application material M and the piston 203 are closely attached to each other, a suction action (an action for maintaining a close contact) caused by depressurization is applied between the piston 203 and the application material M in accordance with the backward movement of the piston 203, and the application material M is pulled back within the filling member 201 so as to be moved backward. The click feeling generated by the click mechanism 220 is given to the user even at a time when the movable body 204 moves backward. In this case, particularly when the application material M is constituted, for example, by a soft, jelly state or mousse state stick body, the application material M tends to be closely attached to the filling member 201 and the piston 203. Accordingly, the suction action mentioned above further better works.

Even in the application material extruding container 300 in accordance with the third embodiment mentioned above, since the female thread member 205 is structured by integrally forming the outer tube 205a, and the inner tube 205b positioned in the inner side so as to be formed approximately coaxial with the outer tube 205a, and is provided with the space portion 205s which is open to one side in the axial direction so as to be formed as the annular shape, the female thread 205e which is provided on the inner peripheral surface of the inner tube 205b and is formed from one side in the axial direction so as to extend in the axial direction, and the slits 205n which communicate the inner and outer sides in the diametrical direction and extend in the axial direction so as to be open to one side, between the outer tube 205a and the inner tube 205b, it is possible to employ the forming method explained in the first and second embodiments mentioned above. Accordingly, the same operations and effects as those of the first and second embodiments can be achieved.

In this case, in the present embodiment, the whole of the inner tube 205b is positioned within the outer tube 205a, however, a part of the inner tube 205b may be positioned within the outer tube 205a.

In this connection, in the first to third embodiments, since it is possible to arrange the protrusions 5d, 105f and 205d constructing the rotation stop of the female thread members 5, 105 and 205, and the female threads 5e, 105j and 205e so as to overlap in the radial direction, by interposing the space portions 5s, 105y and 205s therebetween, there can be obtained an effect that it is possible to shorten a overall length of the female thread members 5, 105 and 205, and it is possible to shorten the whole of the container.

The description is specifically given above of the present invention on the basis of the embodiments, however, the present invention is not limited to the embodiments mentioned above, but the male thread and the female thread maybe replaced with those which carry out the same function as a thread ridge such as a group of projections arranged intermittently or a group of projections arranged spirally and intermittently, and the engagement projection may be constituted by a continuous thread ridge.

Further, each of the extruding mechanisms of the movable bodies in accordance with the first embodiment, the second embodiment and the third embodiment may be replaced by the extruding mechanism in accordance with the other embodiment.

Further, the click teeth may be selected among those having various shapes depend on the click feeling and the ratchet function, such as an obtuse triangle, an acute triangle, a right triangle, an isosceles triangle, a semi spherical shape and the like.

What is claimed is:

1. An application material extruding container comprising:
    a female thread member and a movable body provided within the container; and
    an engagement portion constituted by a female thread provided on an inner peripheral surface of said female thread member and a male thread provided on an outer peripheral surface of said movable body;
    the engagement portion being actuated on the basis of a relative rotation between a container front portion and a container rear portion, whereby said movable body moves forward and an application material within the container appears from an opening at a leading end of the container,
    wherein said female thread member includes an outer tube, an inner tube arranged in an inner side of the outer tube so as to be approximately coaxial with the outer tube, and a coupling portion for integrally connecting said outer tube and said inner tube,
    wherein an annular space portion is open at a side opposite from said coupling portion in the axial direction between said outer tube and said inner tube, and
    wherein said inner tube is provided on an inner peripheral surface with said female thread extending in the axial direction, and is provided with slits-extending in the axial direction and being communicated with said annular space portion.

2. An application material extruding container as claimed in claim 1, wherein the container further comprises:
    a filling member constructing said container front portion and being filled with said application material; and
    an operation tube constructing said container rear portion and engaging so as to move said movable body in the axial direction when synchronously rotating around the axis with said movable body, and
    wherein an outer peripheral surface of said outer tube of said female thread member has a first engagement portion synchronously rotating around the axis with said filling member.

3. An application material extruding container as claimed in claim 1, wherein the container further comprises:
    a filling member constructing said container front portion and being filled with said application material; and
    a rotation stop member engaging so as to move said movable body in the axial direction when synchronously rotating around the axis with said movable body, and engaging with said container rear portion in a rotating direction around the axis and the axial direction so as to be integrated, and
    wherein an outer peripheral surface of said outer tube of said female thread member has a first engagement portion synchronously rotating around the axis with said filling member, and a second engagement portion engaging with said rotation stop member in the axial direction so as to be relatively rotatable with respect to the rotation stop member.

4. An application material extruding container as claimed in claim 3, wherein said rotation stop member has an engagement portion engaging with said filling member in the axial direction so as to be relatively rotatable between said rotation stop member and said filling member.

5. An application material extruding container as claimed in claim 4, wherein said container rear portion has engagement pawl pieces provided in a protruding manner at a bottom so as to extend in the axial direction, and said rotation stop member is engaged at a bottom thereof with said container rear portion in the axial direction by said engagement pawl pieces and is engaged in the rotating direction around the axis.

6. An application material extruding container as claimed in claim 3, wherein said container rear portion has engagement pawl pieces provided in a protruding manner at a bottom so as to extend in the axial direction, and said rotation stop member is engaged at a bottom thereof with said container rear portion in the axial direction by said engagement pawl pieces and is engaged in the rotating direction around the axis.

7. An application material extruding container as claimed in any one of claims 3, 4, 6 and 5, wherein a cylinder portion constructing said rotation stop member is provided with slits and has flexibility.

* * * * *